(12) United States Patent
Nomura et al.

(10) Patent No.: US 7,054,540 B2
(45) Date of Patent: May 30, 2006

(54) INFORMATION PROCESSING APPARATUS AND METHOD, AND PROGRAM STORAGE MEDIUM

(75) Inventors: Yasuo Nomura, Kanagawa (JP); Tatsuo Eguchi, Kanagawa (JP); Yasuhiko Terashita, Kanagawa (JP); Nobuaki Yamaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1167 days.

(21) Appl. No.: 09/773,918

(22) Filed: Feb. 2, 2001

(65) Prior Publication Data

US 2001/0028787 A1    Oct. 11, 2001

(30) Foreign Application Priority Data

Feb. 4, 2000    (JP)    ............................... 2000-027893

(51) Int. Cl.
*H04N 5/93*  (2006.01)
*H04N 7/64*  (2006.01)
*H04N 9/64*  (2006.01)

(52) U.S. Cl. ............................. 386/52; 386/4; 386/113; 386/21; 386/53; 369/83; 348/700

(58) Field of Classification Search ................. 386/120, 386/52, 113, 118, 96; 375/240.24; 348/700

See application file for complete search history.

(56) References Cited

U.S. PATENT DOCUMENTS

| 5,903,313 A * | 5/1999 | Tucker et al. .......... 375/240.15 |
| 6,307,580 B1 * | 10/2001 | Yoshikawa .................. 347/200 |
| 6,356,709 B1 * | 3/2002 | Abe et al. .................... 386/117 |
| 2001/0001614 A1 * | 5/2001 | Boice et al. .......... 375/240.24 |
| 2003/0142955 A1 * | 7/2003 | Hashizume et al ........... 386/52 |

* cited by examiner

*Primary Examiner*—Robert Chevalier
*Assistant Examiner*—Jamie Jo Vent
(74) *Attorney, Agent, or Firm*—Oblon, Spivak, McCelland, Maier & Neustadt, P.C.

(57) ABSTRACT

An information processing apparatus comprising: a first recording controlling element for recording moving images; a first detecting element for detecting scene changes in the moving images recorded by the first recording controlling element; a second recording controlling element which, if scene changes are detected from the moving images by the first detecting element, then records still images corresponding to the detected scene changes together with time stamps pertaining to the recorded still images; a third recording controlling element which, if no still image is recorded by the second recording controlling element over a predetermined time period, then records still images at predetermined intervals based on the moving images together with time stamps pertaining to the recorded still images; a first playback controlling element for playing back the moving images recorded by the first recording controlling element; and a second playback controlling element for playing back the recorded still images in a display window at relative distances to one another proportional to differentials between the time stamps.

16 Claims, 24 Drawing Sheets

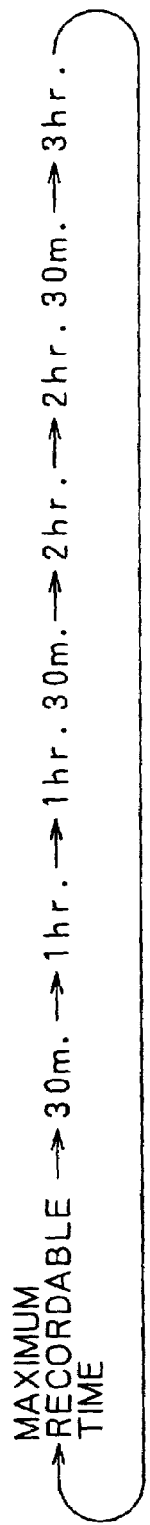
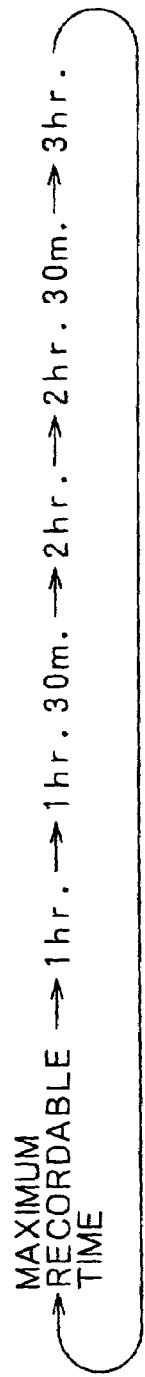
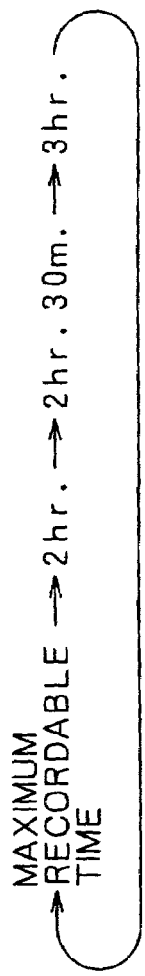
FIG.11A
FIG.11B
FIG.11C

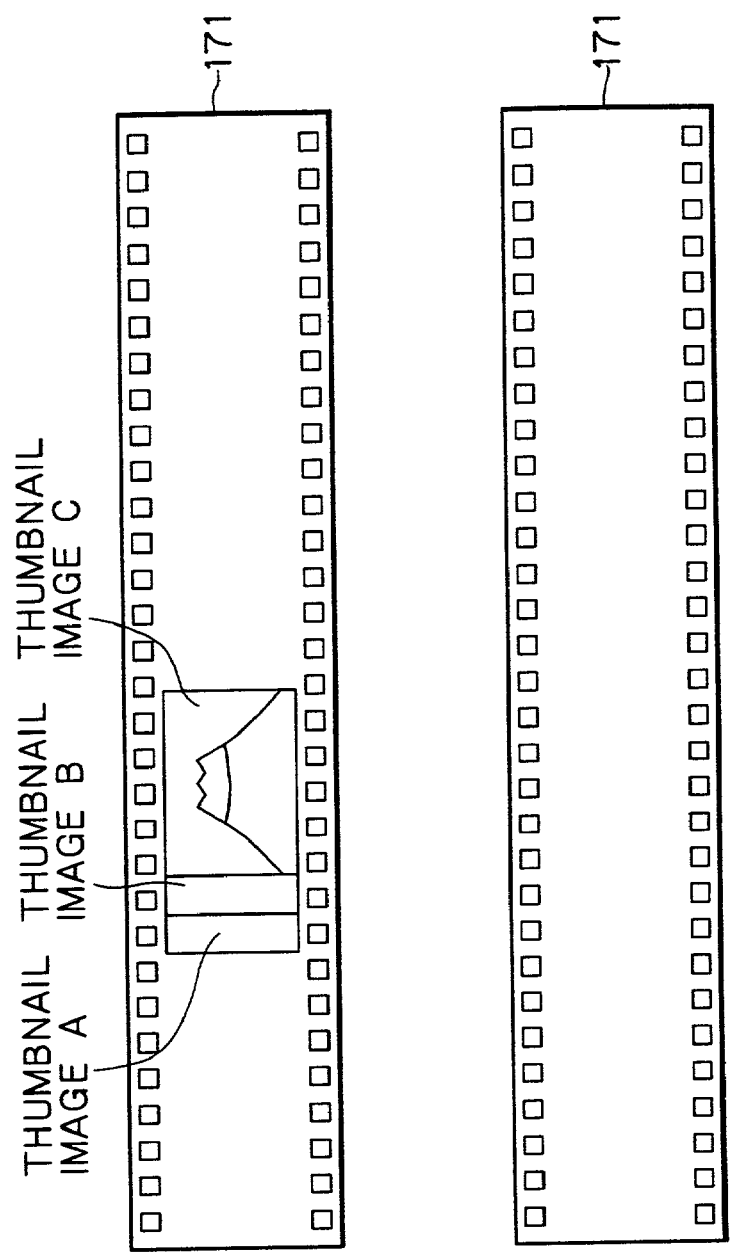

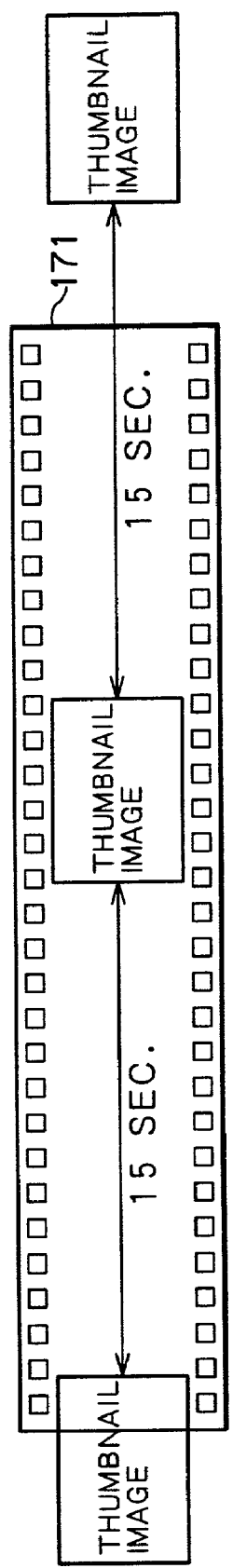

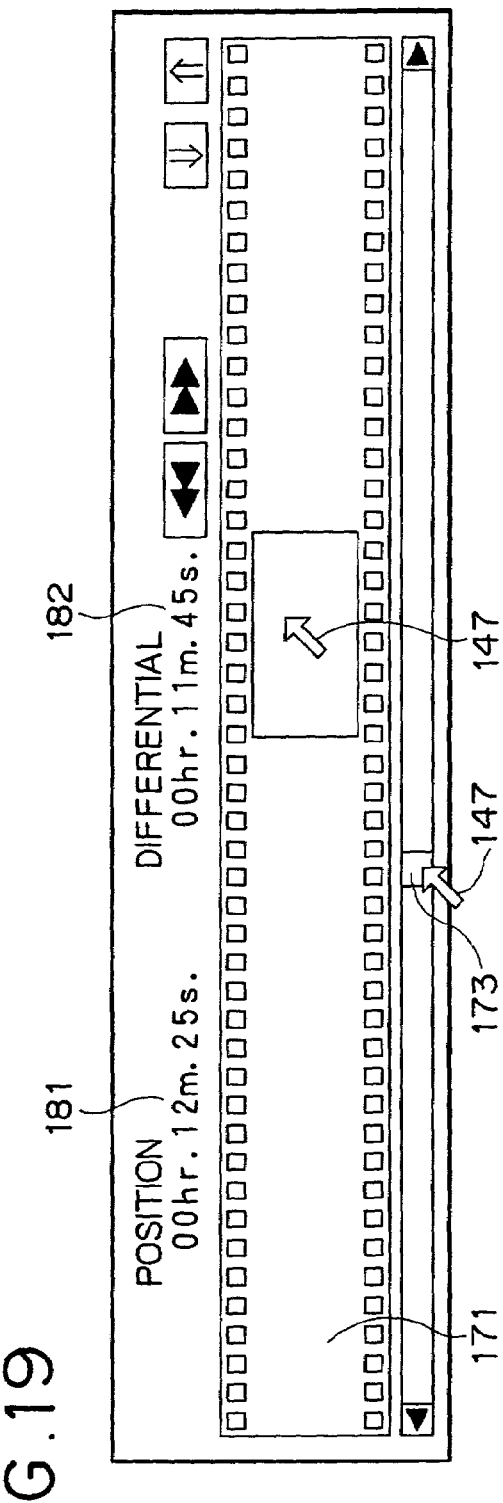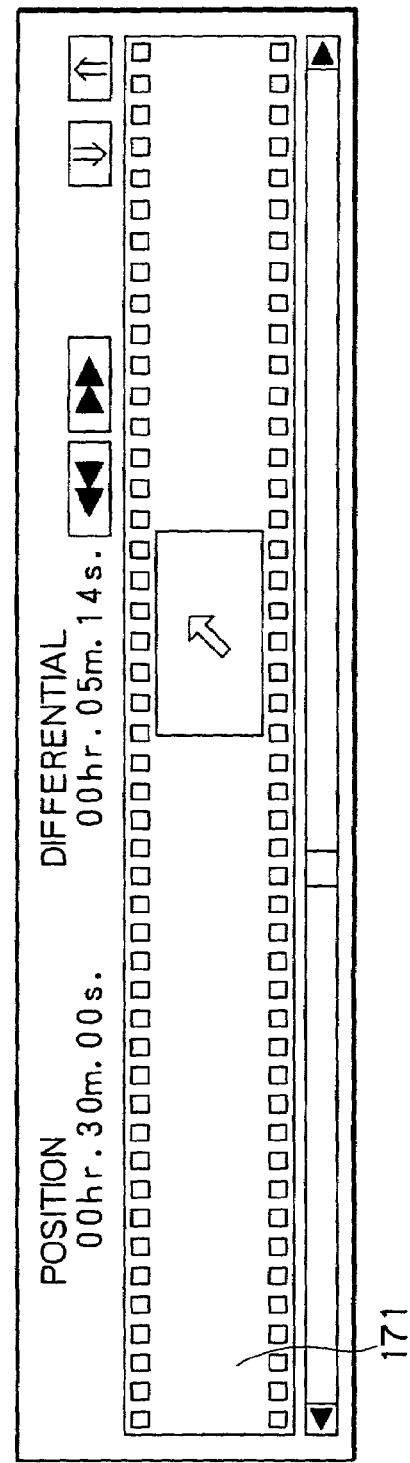

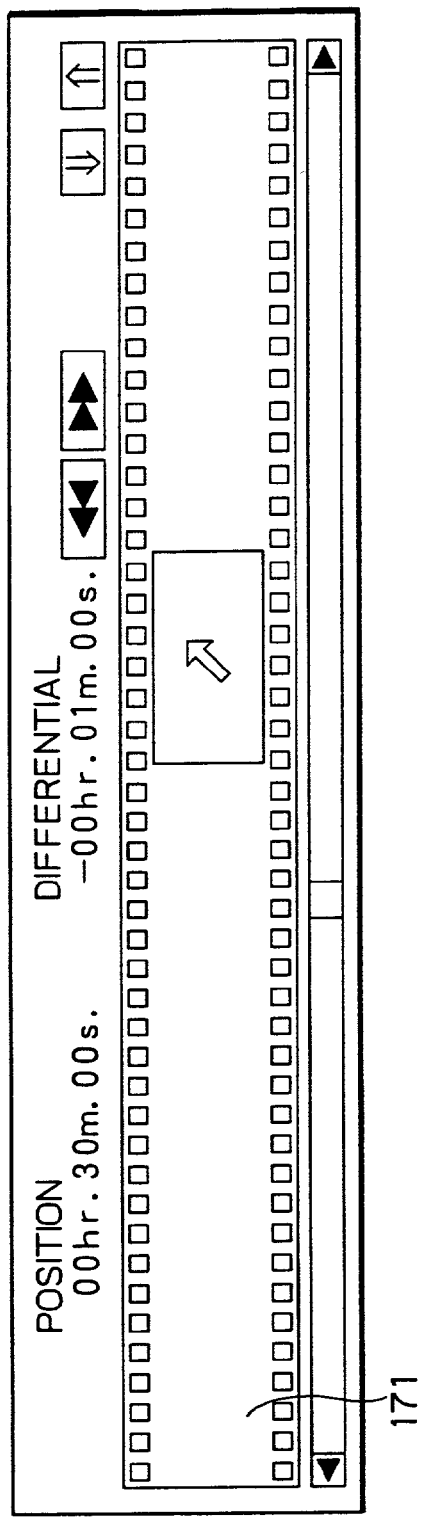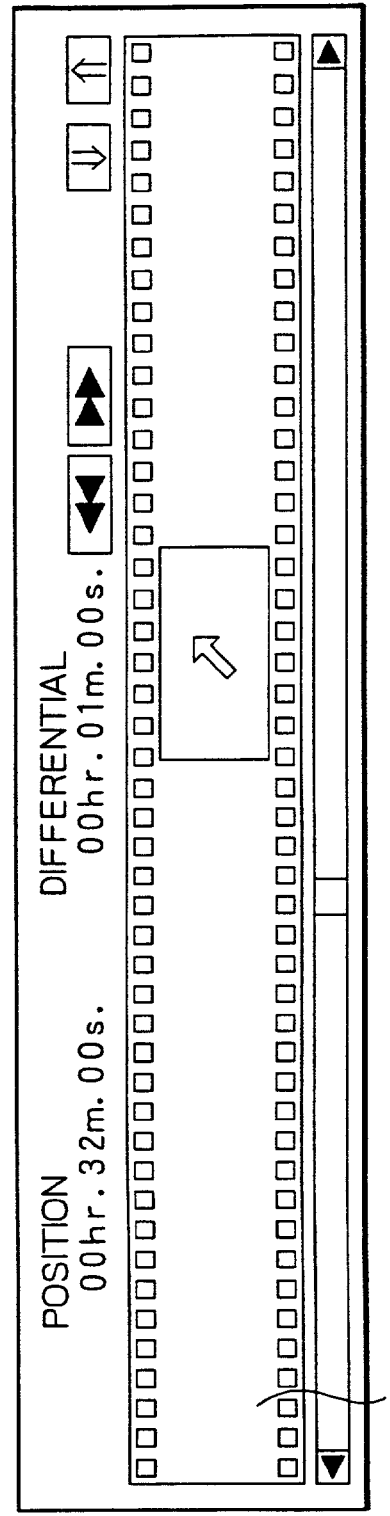

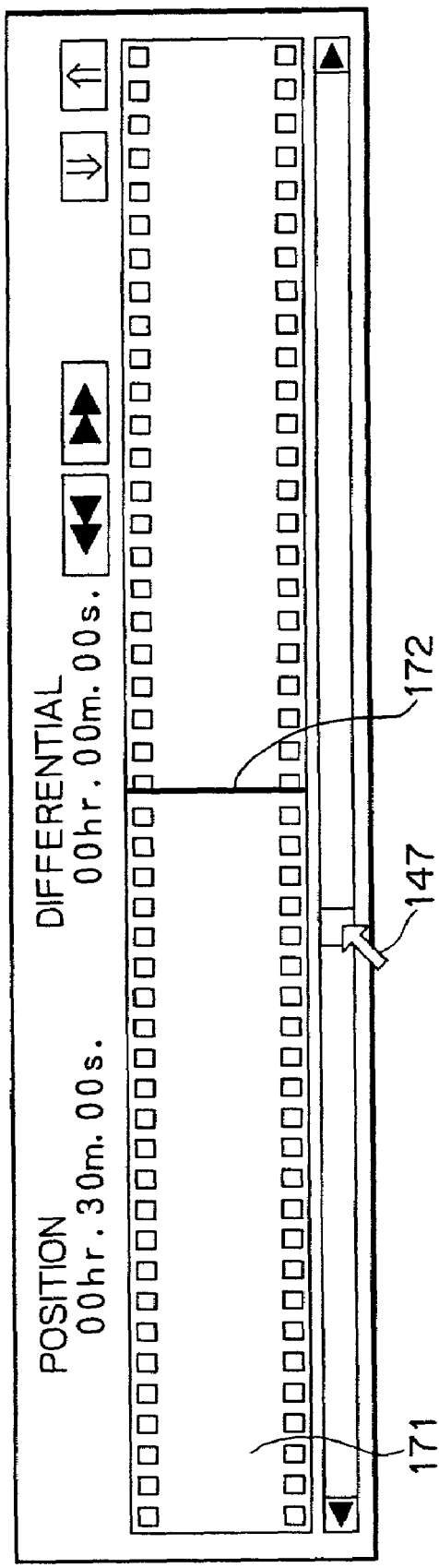

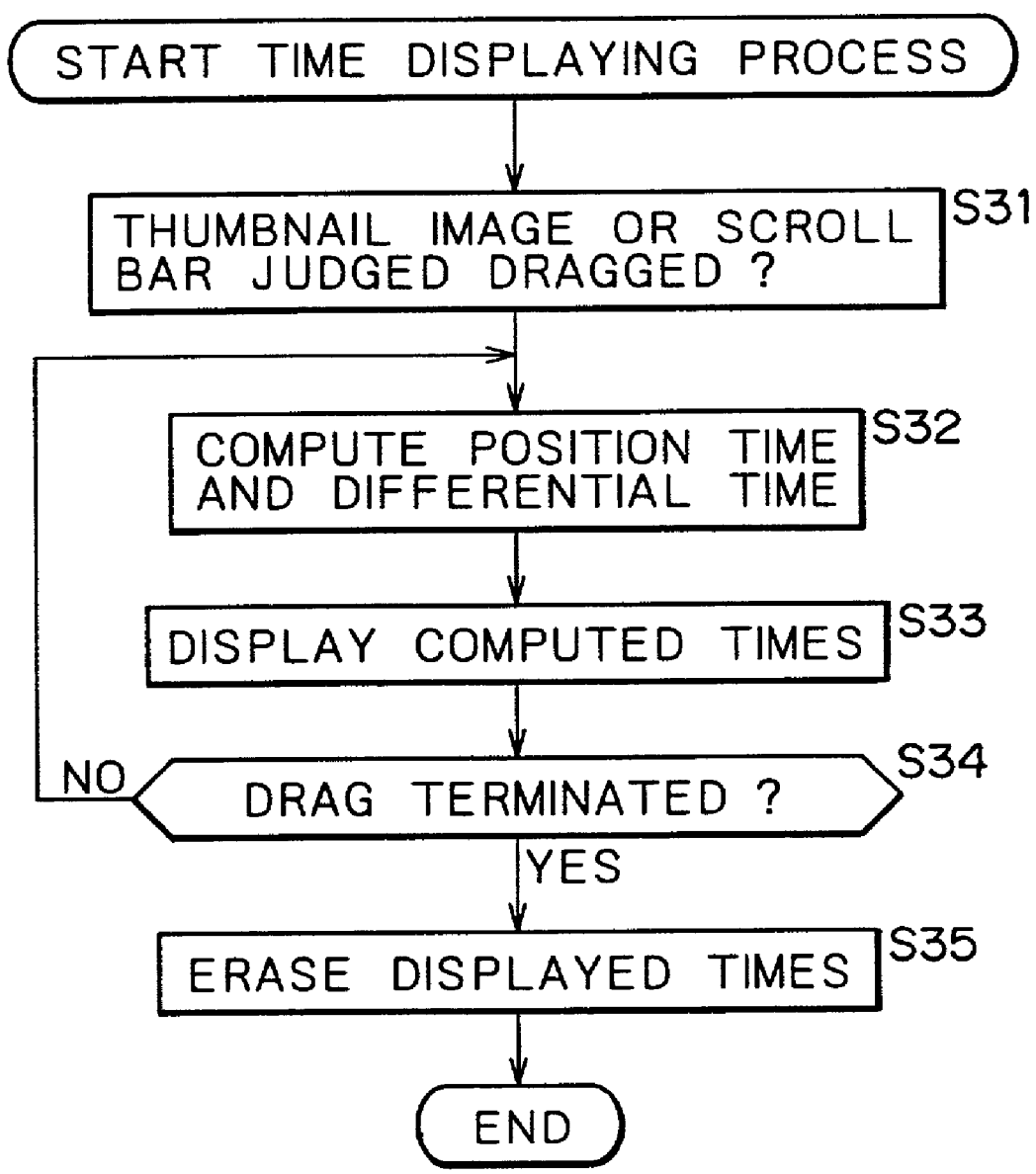

INFORMATION PROCESSING APPARATUS AND METHOD, AND PROGRAM STORAGE MEDIUM

BACKGROUND OF THE INVENTION

The present invention relates to an apparatus and a method for information processing and to a program storage medium for storing a program of information processing. More particularly, the invention relates to an apparatus and a method for information processing and a program storage medium for use with a device that displays thumbnail images for reference purposes.

Gaining widespread acceptance today are techniques whereby a tuner incorporated in a personal computer receives video and audio signals from television broadcasting stations before converting the received signals into appropriate digital data and recording them to a storage medium such as a hard disk so that the received images and sounds may later be played back as needed.

Unlike conventional systems that use videotapes, the recently-spreading setup in which the personal computer is used to record and play back programs broadcast by TV stations takes little time in rewinding or fast forwarding recordings to be played back. That is, desired scenes can be accessed and viewed with virtually no lapse of time. Users need only refer to thumbnail images displayed on a screen when searching for preferred scenes represented thereby.

One problem with such thumbnail images, however, is that they are generated only when scene changes take place. It follows that frequent scene changes produce overlapping thumbnail images while the absence of changing scenes prompts no thumbnail image generation. This often makes it difficult for users to find the scenes they want.

SUMMARY OF THE INVENTION

It is therefore an object of the present invention to overcome the above and other deficiencies of the related art and to provide an apparatus and a method for information processing and a program storage medium for displaying thumbnail images in an optimized manner to let users reach desired scenes with ease.

Other objects, features and advantages of the invention will become more apparent upon a reading of the following description and appended drawings.

BRIEF DESCRIPTION OF THE DRAWINGS

FIGS. 11A, 11B and 11C are explanatory view depicting how recording times are changed by clicking on a recording time changing button 151;

FIGS. 16A and 16B are explanatory views showing how thumbnail images are typically displayed in a still image display window 171;

FIG. 18 is another explanatory view depicting how thumbnail images are typically displayed in the still image display window 171;

FIG. 19 is an explanatory view sketching how times are typically displayed;

FIG. 20 is another explanatory view showing how times are typically displayed;

FIGS. 21A and 21B are more explanatory views showing how times are typically displayed;

FIG. 22 is another explanatory view depicting how times are typically displayed;

FIG. 25 is a flowchart of steps constituting a time displaying process.

DESCRIPTION OF THE PREFERRED EMBODIMENTS

Figure 1:
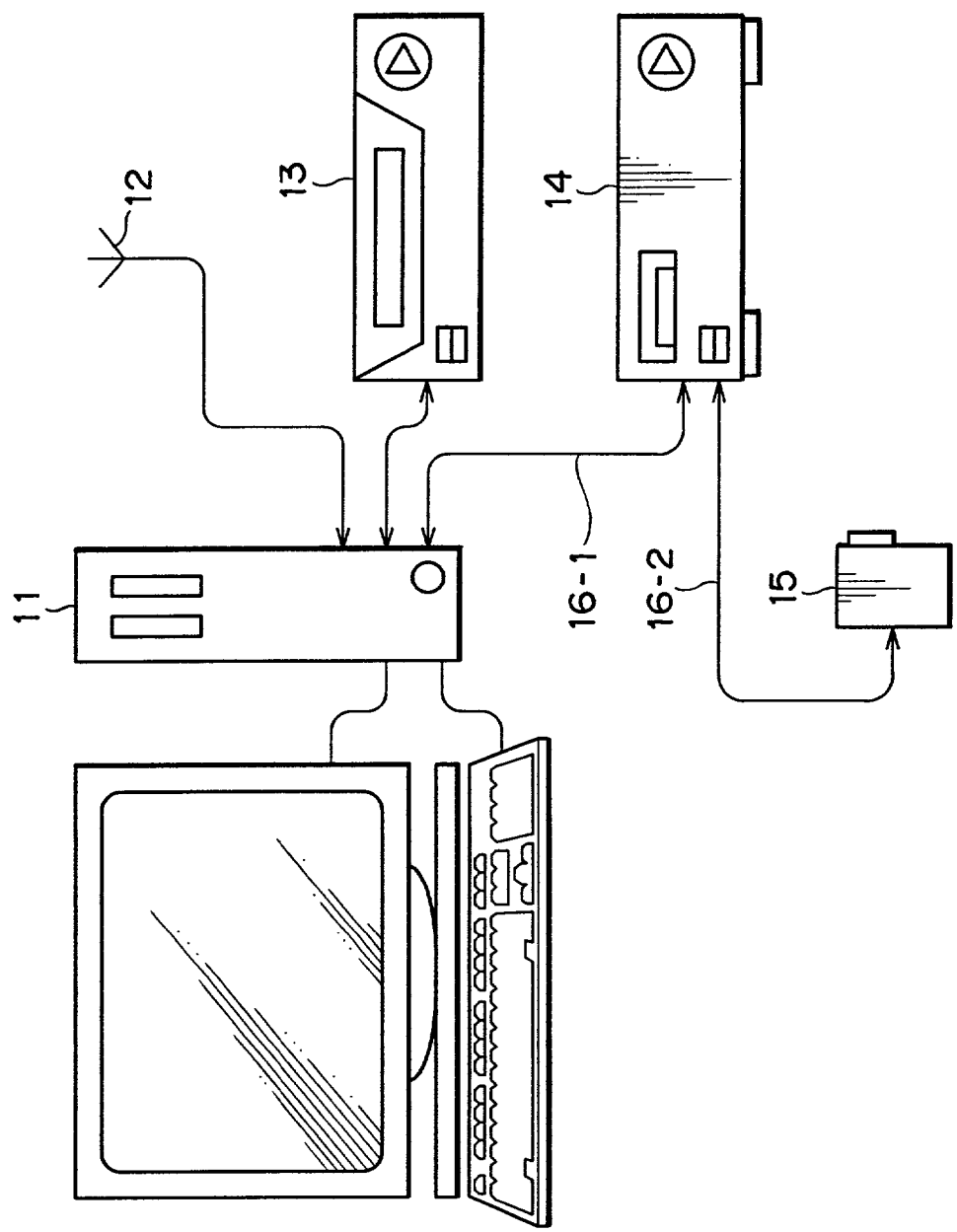
FIG. 1 is a schematic view of an image recording and playback system embodying this invention.

FIG. 1 is a schematic view of an image recording and playback system embodying the present invention. In the system, a personal computer 11 inputs signals from an antenna 12 that receive radio waves from television stations, plays back images and sounds (of broadcast programs) represented by the received signals, and records these images and sounds. The personal computer 11 also plays back images and sounds constituted by analog signals from a VCR (Video Cassette Recorder) 13 or by digital data sent from a DVCR (Digital Video Cassette Recorder) 14 or from a DVCR 15 with an image pickup function by way of a network 16-1 or 16-2 such as one compatible with IEEE (Institute of Electrical and Electronic Engineers) 1394 criteria. These images and sounds are recorded as well.

The personal computer 11 supplies the VCR 13 with analog signals (such as those in the NTSC (National Television System Committee) format) representative of the images and sounds held by the computer 11, or feeds the DVCR 14 with digital data constituting the images and sounds thus retained. In addition, the personal computer 11 is capable of editing such recorded sounds and images.

Figure 2:
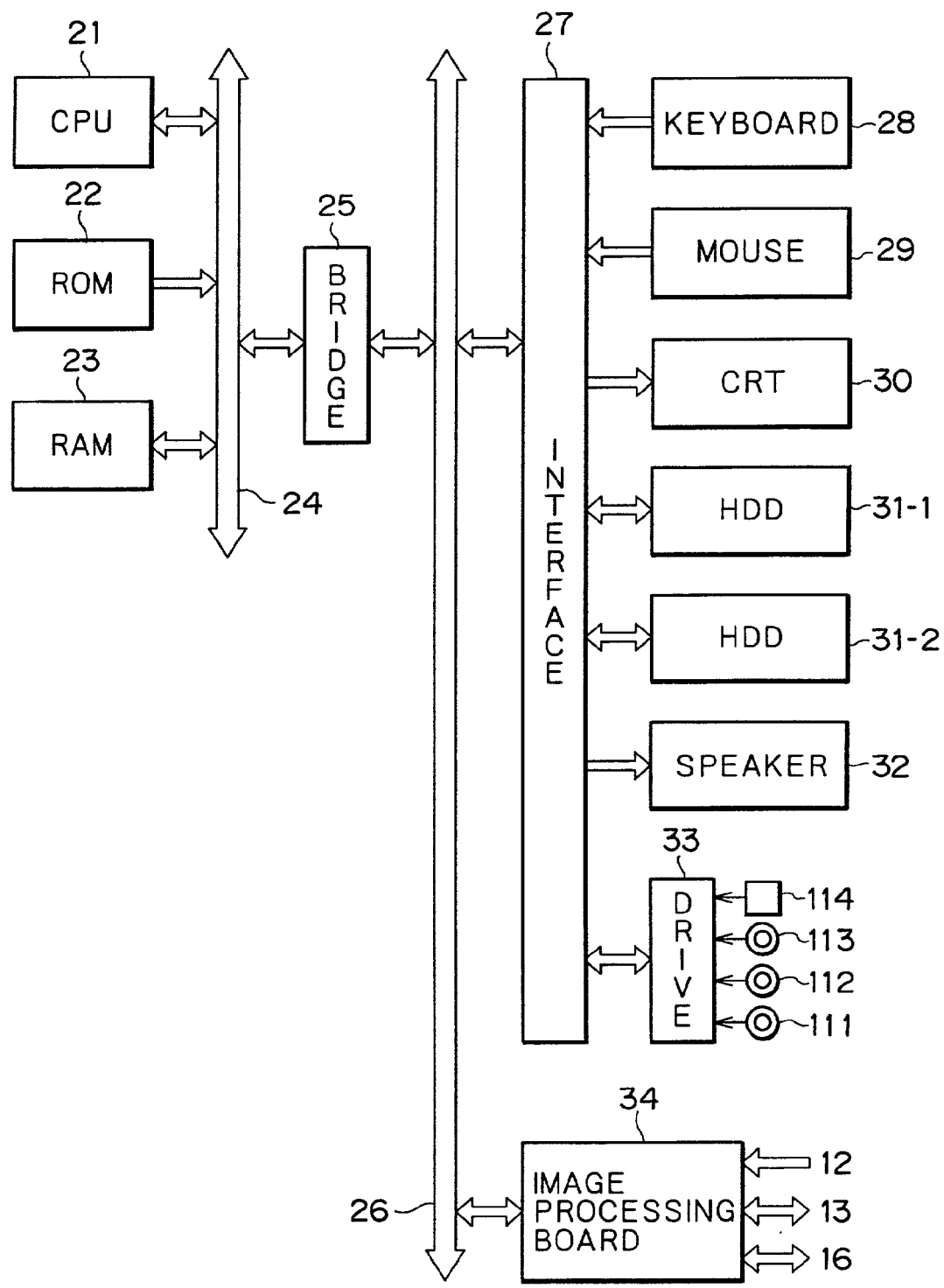
FIG. 2 is a block diagram of a personal computer 11 included in the system of FIG. 1.

FIG. 2 is a block diagram showing how the personal computer 11 is typically structured. A CPU (Central Processing Unit) 21 is a unit that actually executes application programs on the basis of an OS (Operating System). A ROM (Read-Only Memory) 22 retains basically fixed data from among those making up programs and computation parameters for use by the CPU 21. A RAM (Random-Access Memory) 23 accommodates programs executed by the CPU 21 and the parameters that vary during the program execution. These components are interconnected by a host bus 24 made of a CPU bus or a memory bus.

The host bus 24 is connected to an external bus 26 such as a PCI (Peripheral Component Interconnect/Interface) bus through a bridge 25. A keyboard 28 is operated by a user to enter various commands into the CPU 21. A mouse 29 is manipulated by the user designating and selecting the pointer position on a screen of a CRT (Cathode Ray Tube) 30. The CRT 30 displays diverse kinds of information in text or in image. HDDs (Hard Disk Drives) 31-1 and 31-2 each drive a hard disk to record thereon programs and data executed and handled by the CPU 21.

The HDDs 31-1 and 31-2 may carry out recording and playback processes concurrently on a time division basis. Speakers 32 reproduce sounds. The components ranging from the keyboard 28 to the speakers 32 are connected to an interface 27. The interface 27 is in turn connected to the CPU 21 through the external bus 26, bridge 25, and host bus 24. In the description that follows, the HDDs 31-1 and 31-2 will be collectively referred to as the HDD 31 where there is no specific reason to distinguish one from the other.

A drive 33, connected to the interface 27, writes and/or reads programs or information performed and/or handled by the CPU 21 to and from a magnetic disc 111, an optical disc 112, a magneto-optical disc 113, or a semiconductor memory 114. Under control of the CPU 21, an image processing board 34 generates relevant video or audio data based on the signal from the antenna 12, on the analog signal of images and sounds from the VCR 13, or on the digital data of images and sounds from the DVCR 13 or DVCR 14. The video or audio data thus generated are output to the HDD 31-1 or 31-2 over the external bus 26 and through the interface 27.

The image processing board 34 also inputs video or audio data retrieved from the HDD 31-1 or 31-2 through the external bus 26 and interface 27, generates analog signals corresponding to the video or audio data thus input, and sends the generated signals to the VCR 13. Alternatively, the image processing board 34 generates digital data corresponding to the input video or audio data and supplies the generated data to the DVCR 14 over the network 16-1 or to the CRT 30 via the external bus 26. The image processing board 34 may carry out these processes concurrently. The image processing board 34 is connected to the CPU 21 through the external bus 26, bridge 25 and host bus 24.

Figure 3:
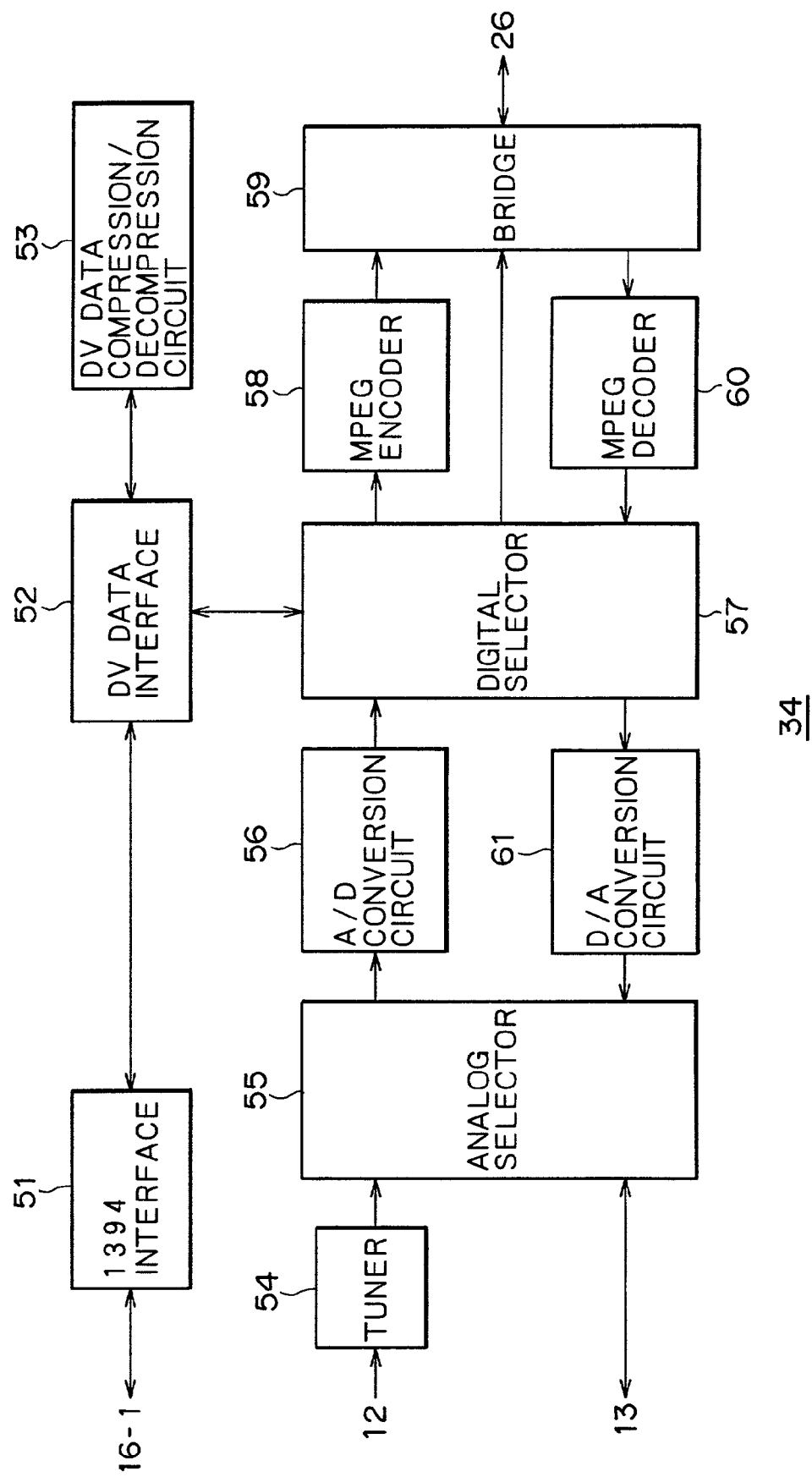
FIG. 3 is a block diagram of an image processing board 34 included in the system of FIG. 1.

Below is a description of how the image processing board 34 is structured. FIG. 3 is a block diagram of the image processing board 34. A 1394 interface 51, structured to comply with IEEE 1394 criteria, is connected to the network 16-1 and receives digital audio and video data in DVCR format from the DVCR 14 or 15 in accordance with an IEEE 1394 protocol. The received data are forwarded to a DV (Digital Video) data interface 52.

In keeping with the IEEE 1394 protocol, the 1394 interface 51 supplies the DVCR 14 with the video or audio digital data in DVCR format from the DV data interface 52. The DV data interface 52 outputs: the video or audio digital data in DVCR format from the 1394 interface 51 or the video or audio digital data from a digital selector 57 (uncompressed data such as those in 4:1:1 format) to a DV data compression/decompression circuit 53; video or audio digital data in DVCR format from the DV data compression/decompression circuit 53 to the 1394 interface 51; and video or audio digital data (decompressed) from the DV data compression/decompression circuit 53 to the digital selector 57.

The DV data compression/decompression circuit 53 receives video or audio digital data in DVCR format from the DV data interface 52, decompresses the received data, and outputs the data to the DV data interface 52. The DV data compression/decompression circuit 53 also receives uncompressed video or audio digital data from the DV data interface 52, compresses the received data into video or audio digital data in DVCR format, and outputs the compressed data to the DV data interface 52.

A tuner 54 inputs RF (Radio Frequency) signals from the antenna 12, and outputs received video or audio analog signals of a desired channel to an analog selector 55. The analog selector 55 selects one of the video or audio analog signal inputs from the tuner 54, VCR 13 and a D/A (Digital/Analog) conversion circuit 61, and outputs what is selected to an A/D (Analog/Digital) conversion circuit 56 or to the VCR 13.

The A/D conversion circuit 56 converts the video and audio analog signal from the analog selector 55 into digital data (such as image data in 4:1:1 format) and outputs the data to the digital selector 57. The digital selector 57 selects one of the video and audio digital data inputs from the DV data interface 52, A/D conversion circuit 56 and an MPEG (Moving Picture Experts Group) decoder 60, and outputs what is selected to the DV data interface 52, an MPEG encoder 58, a bridge 59, or the D/A conversion circuit 61. The digital selector 57 also sends scene switching position information to the bridge 59.

The MPEG encoder 58 compresses video and audio digital data from the digital selector 57 into MPEG digital data and outputs the data to the bridge 59. The MPEG encoder 58 also converts a scene-changing image into a still image for output to the bridge 59. The bridge 59 outputs the video and audio digital data (uncompressed) from the digital selector 57 to the CRT 30 through the PCI bus 26 and interface 27 of the personal computer 11 equipped with the image processing board 34.

The bridge 59 outputs video or audio digital data in MPEG format from the MPEG encoder 58 to the HDD 31-1 or 31-2 or to the CPU 21 via the PCI bus 26 of the personal computer 11 furnished with the image processing board 34. The bridge 59 further receives video or audio digital data in MPEG format from the HDD 31-1 or 31-2 of the personal computer 11, and outputs the received data to the MPEG decoder 60. The bridge 59 may carry out these processes concurrently.

The MPEG decoder 60 decompresses video or image digital data in MPEG format from the bridge 59 and outputs the decompressed video or audio digital data to the digital selector 57. The D/A conversion circuit 61 converts video or audio digital data from the digital selector 57 into analog signals and outputs the signals to the analog selector 55. The processes performed by the MPEG encoder 58 and MPEG decoder 60 may be carried out by the CPU 21 on a software basis.

Figure 4:
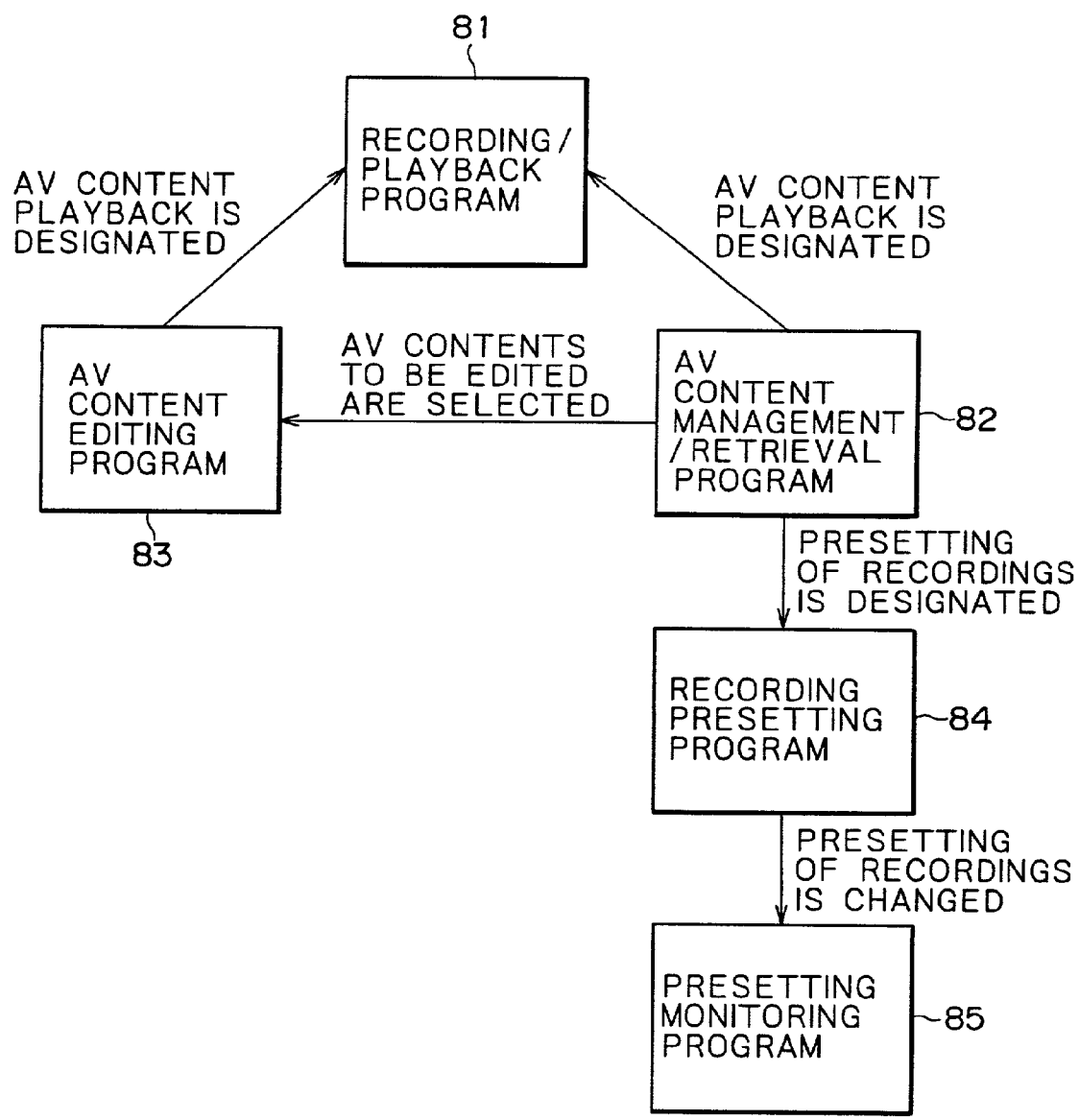
FIG. 4 is an explanatory view of application programs performed by the personal computer 11.

FIG. 4 is an explanatory view of application programs performed by the personal computer 11. The recording/playback program 81 causes the image processing board 34 to select video and audio analog signals of a desired channel from the tuner 54, video and audio analog signals from the VCR 13, or video and audio digital data from the DVCR 14. The program 81 then causes the image processing board 34 to convert the selected analog signals or digital data into video or audio digital data in MPEG format and to record the selected signals or data to the HDD 31-1 or 31-2 as AV (Audio Visual) contents composed of at least one file in a suitable format.

The recording/playback program 81 causes the image processing board 34 to decompress AV contents of at least one file in the appropriate format retrieved from the HDD 31-1 or 31-2 to generate decompressed video or audio digital data. The decompressed data are used to display images on the CRT 30 and to reproduce sounds through the speakers 32.

An AV content management/retrieval program 82 displays AV contents or relevant information such as recording dates and times retrieved from the HDD 31-1 or 31-2. The program 82 also instructs the recording/playback program 81 to play back desired AV contents, selects AV contents to be edited, supplies an AV content editing program 83 with the selected AV contents, and causes a recording presetting program 84 to handle the presetting of broadcast programs to be recorded.

Based on the AV contents held on the HDD 31-1 or 31-2, the AV content editing program 83 edits necessary images and sounds of the selected contents (i.e., puts together images and sounds from the contents) to generate AV contents in a relevant format which are later played back. The AV contents are formed not by video or audio digital data but by information specifying the selected AV contents as well as the images and sounds to be used. The AV contents thus prepared are played back by the recording/playback program 81.

Based on preselected settings, the recording presetting program 84 generates AV contents by which to carry out presetting of recordings. The AV contents corresponding to the settings (recording times and recording mode that determine image quality) are generated to secure beforehand storage regions on the HDD 31-1 or 31-2. A presetting monitoring program 85 remains active (i.e., stays memory-resident) when the personal computer 11 is in operation (i.e., when the OS is running), carrying out presetting of recordings based on the AV contents generated by the recording presetting program 84 and on time data fed by an RTC (Real Time Clock), not shown. The presetting monitoring program 85 may modify AV content settings in executing preset recordings.

Figure 5:
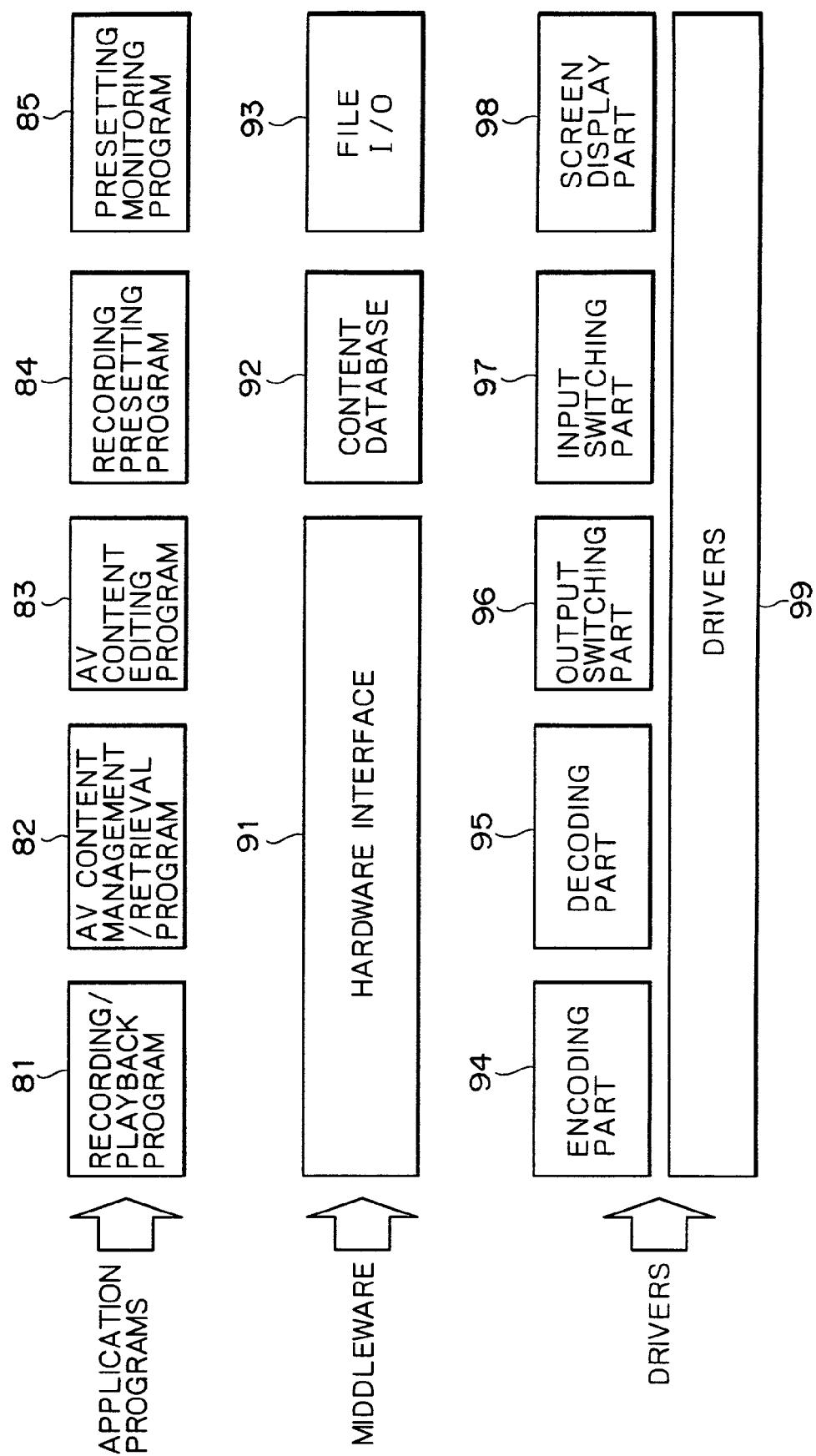
FIG. 5 is an explanatory view of application programs, middleware and drivers executed by the personal computer 11.

FIG. 5 is an explanatory view of application programs, middleware and drivers executed by the personal computer 11. The middleware runs necessary drivers in response to requests from the application programs. The drivers actually operate relevant hardware resources such as the MPEG encoder 58 of the image processing board 34.

A hardware interface 91 arbitrates requests by the recording/playback program 81, AV content management/retrieval program 82, AV content editing program 83, recording presetting program 84 or presetting monitoring program 85 for the use of hardware resources in such a manner that the application programs may utilize the required hardware resources in keeping with various priorities and other relevant settings.

A content database 92 manages attribute data of AV contents, to be described later. In so doing, the content database 92 provides the recording/playback program 81, AV content management/retrieval program 82, AV content editing program 83, recording presetting program 84, or presetting monitoring program 85 with AV content attribute data or with data for designating files that contain video or audio digital data representative of AV contents.

A file I/O (Input/Output) 93 actually executes writing or reading of data to or from relevant files in response to write or read requests by the recording/playback program 81, AV content management/retrieval program 82, AV content editing program 83, recording presetting program 84 or presetting monitoring program 85 with respect to AV contents (made up of at least one file).

An encoding part 94 causes the MPEG encoder 58 of the image processing board 34 to compress video or audio data from the digital selector 57 into MPEG digital data. A decoding part 95 causes the MPEG decoder 60 of the image processing board 34 to decompress MPEG video or image digital data from the bridge 59.

An output switching part 96 operates the analog selector 55 and 1394 interface 51 of the image processing board 34 to control the output of analog signals from the image processing board 34 or of digital data over the network 16-1. An input switching part 97 operates the analog selector 55, 1394 interface 51, DV data interface 52, and digital selector 57 of the image processing board 34 to select either analog signals or digital data to be input to the image processing board 34.

A screen display part 98 operates the digital selector 57 and bridge 59 to control the display of images on the CRT 30. Drivers 99 are programs that actually operate the image processing board 34 in response to requests by the encoding part 94, decoding part 95, output switching part 96, input switching part 97, and screen display part 98. The description that follows will omit all references to the processing of sounds.

Figure 6:
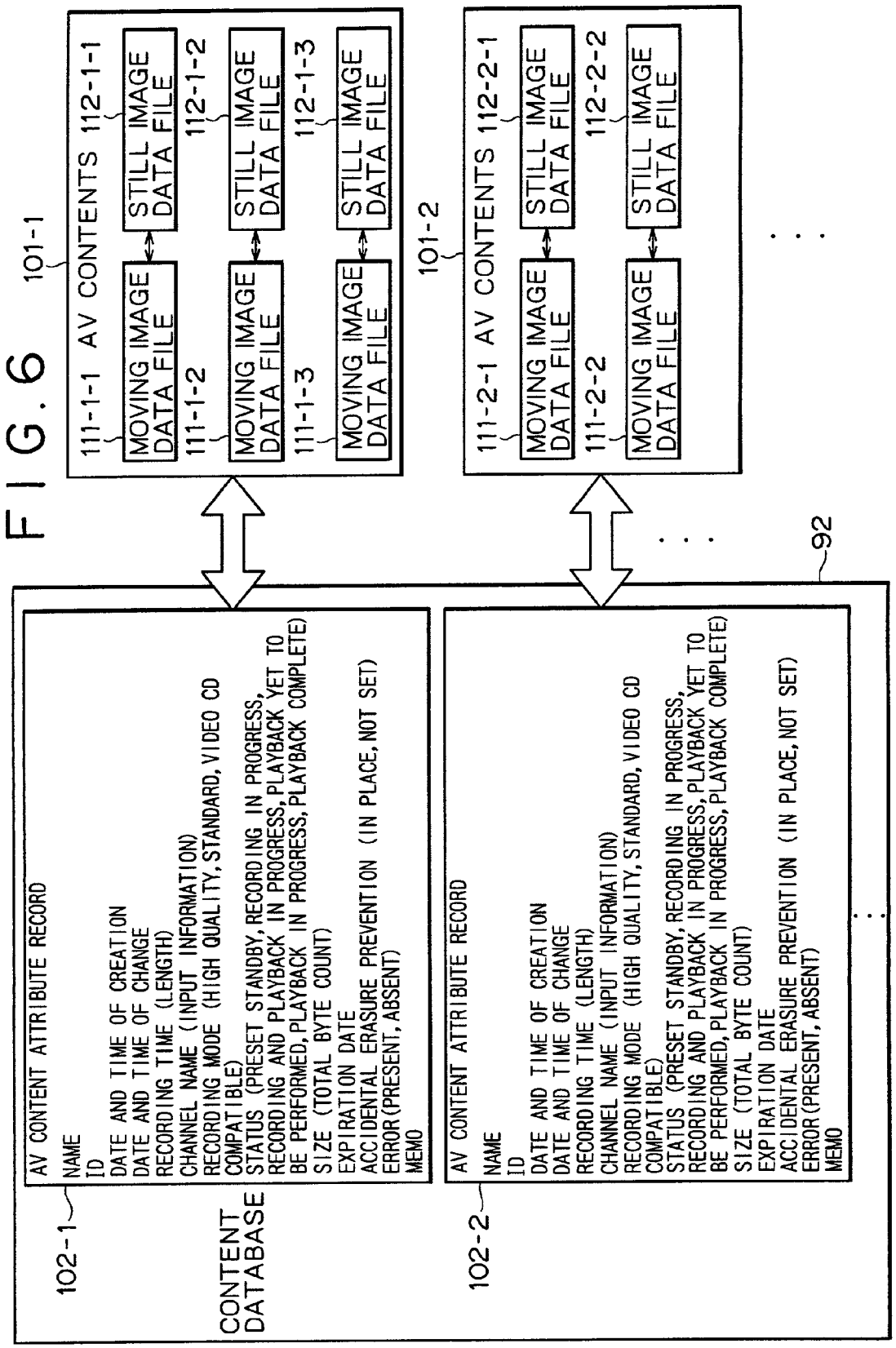
FIG. 6 is an explanatory view showing how AV contents are typically structured.

FIG. 6 is an explanatory view showing how AV contents are typically structured. The content database 92 on the HDD 31-1 or 31-2 retains attributes of AV contents. An AV content attribute record 102-1 held in the content database 92 provides attributes of AV contents 101-1 such as name, ID (Identification Data), date and time of creation, date and time of change, recording time, channel name, recording mode, status, expiration date (designated by date and time), setting of accidental erasure prevention, presence or absence of error, two-dimensional bar code (e.g., Cybercode (registered trademark)), and memo. An AV content attribute record 102-2 also contained in the content database 92 provides attributes of AV contents 101-2 such as name, ID, date and time of creation, date and time of change, recording time, channel name, recording mode, status, expiration date, setting of accidental erasure prevention, presence or absence of error, and memo.

The "recording mode" data held in the AV content attribute record 102-1 indicate that moving image data files 111-1-1 through 111-1-3 are in high quality, standard, or video CD compatible (i.e., video data in MPEG1 format) mode. Likewise, the "status" data in the AV content attribute record 102-1 indicate that the AV contents 101-1 are in preset-standby, recording-in-progress, recording-and-playback-in-progress (video data are being recorded and played back concurrently), playback-yet-to-be-performed, playback-in-progress, or playback-complete status.

The "error" data denote faulty states of the AV contents 101-1, such as a recording session stopped halfway due to troubles of the personal computer 11 during recording operation, images not obtained when played back using signals from the antenna 12 due to poor reception status during recording, or segments missing from the moving image data file 111-1-1. There is one of two settings for the expiration date and accidental erasure prevention: neither the expiration date nor accidental erasure prevention is set, or only one of the two attributes is set. The expiration date and accidental erasure prevention will not be set at the same time.

The "recording mode data" in the AV content attribute record 102-2 indicates that the moving image data files 111-2-1 through 111-2-3 are in high quality, standard, or video CD compatible mode. Similarly, the "status" data in the AV content attribute record 102-2 indicate that the AV contents 101-2 are in preset-standby, recording-in-progress, recording-and-playback-in-progress, playback-yet-to-be-performed, playback-in-progress, or playback-complete status.

The AV contents 101-1 are constituted by the moving image data files 111-1-1 through 111-1-3 recorded on the HDD 31-1 or 31-2, and by still image data files 112-1-1 through 112-1-3 on the HDD 31-1 or 31-2. The moving image data files 111-1-1 through 111-1-3 accommodate video data in MPEG format. An image corresponding to the video data stored at the start of the moving image data file 111-1-2 continues to an image represented by the video data held at the end of the moving image data file 111-1-1. Likewise, an image corresponding to the video data stored at the start of the moving image data file 111-1-3 continues to an image represented by the video data held at the end of the moving image data file 111-1-2.

The still image data file 112-1-1 accommodates both video data representative of a still image converted from a scene-changing image of video data held in the moving image data file 111-1-1, and data regarding the applicable scene-changing time (or an offset position in the moving image data file 111-1-1). The still image data file 112-1-2 holds both video data representative of a still image converted from a scene-changing image of video data in the moving image data file 111-1-2, and data regarding the applicable scene-changing time (or an offset position in the moving image data file 111-1-2). The still image data file 112-1-3 retains both video data representative of a still image converted from a scene-changing image of video data in the moving image data file 111-1-3, and data regarding the applicable scene-changing time (or an offset position in the moving image data file 111-1-3).

The AV contents 101-2 are made up of the moving image data files 111-2-1 and 111-2-2, as well as of still image data files 112-2-1 and 112-2-2, in the same manner as the AV contents 101-1 above. Thus the AV contents 101-2 will not be described further.

In the description that follows, the AV contents 101-1 and 101-2 will be referred to collectively as the AV contents 101 where there is no specific reason to distinguish them. Likewise, the AV content attribute records 102-1 and 102-2 will be referred to collectively as the AV content attribute record 102; the moving image data files 111-1-1 through 111-1-3 as well as 111-2-1 and 111-2-2, as the moving image data file 111; and the still image data files 112-1-1 through 112-1-3 as well as 112-2-1 and 112-2-2, as the still image data file 112.

Figure 7:
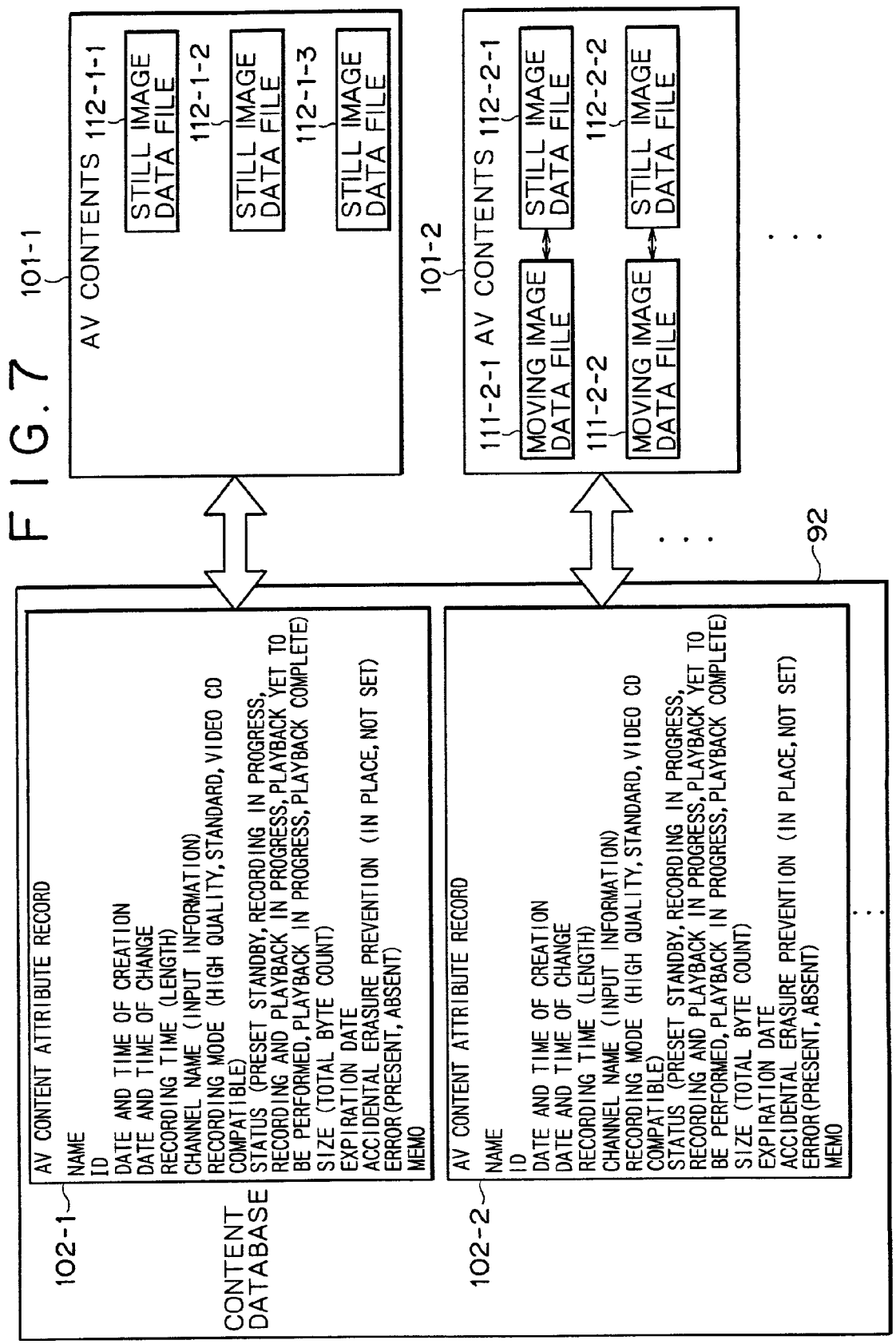
FIG. 7 is another explanatory view showing how AV contents are typically structured.

FIG. 7 is another explanatory view showing how the AV contents 101 with no moving image data file are typically structured. Illustratively, the images and sounds corresponding to the moving image data files 111-1-1 through 111-1-3 held in the AV contents 101-1 may be recorded to a suitable videotape cassette and then the files 111-1-1 through 111-1-3 may be erased. In that case, the AV contents 101-1 are constituted by the still image data files 112-1-1 through 112-1-3 and contain no moving image data file 111.

If the AV contents 101 excluding the moving image data file 111 corresponding to a suitable videotape cassette are later retrieved and put to use, the related images and sounds recorded on the relevant videotape are made available therefrom.

Figure 8:
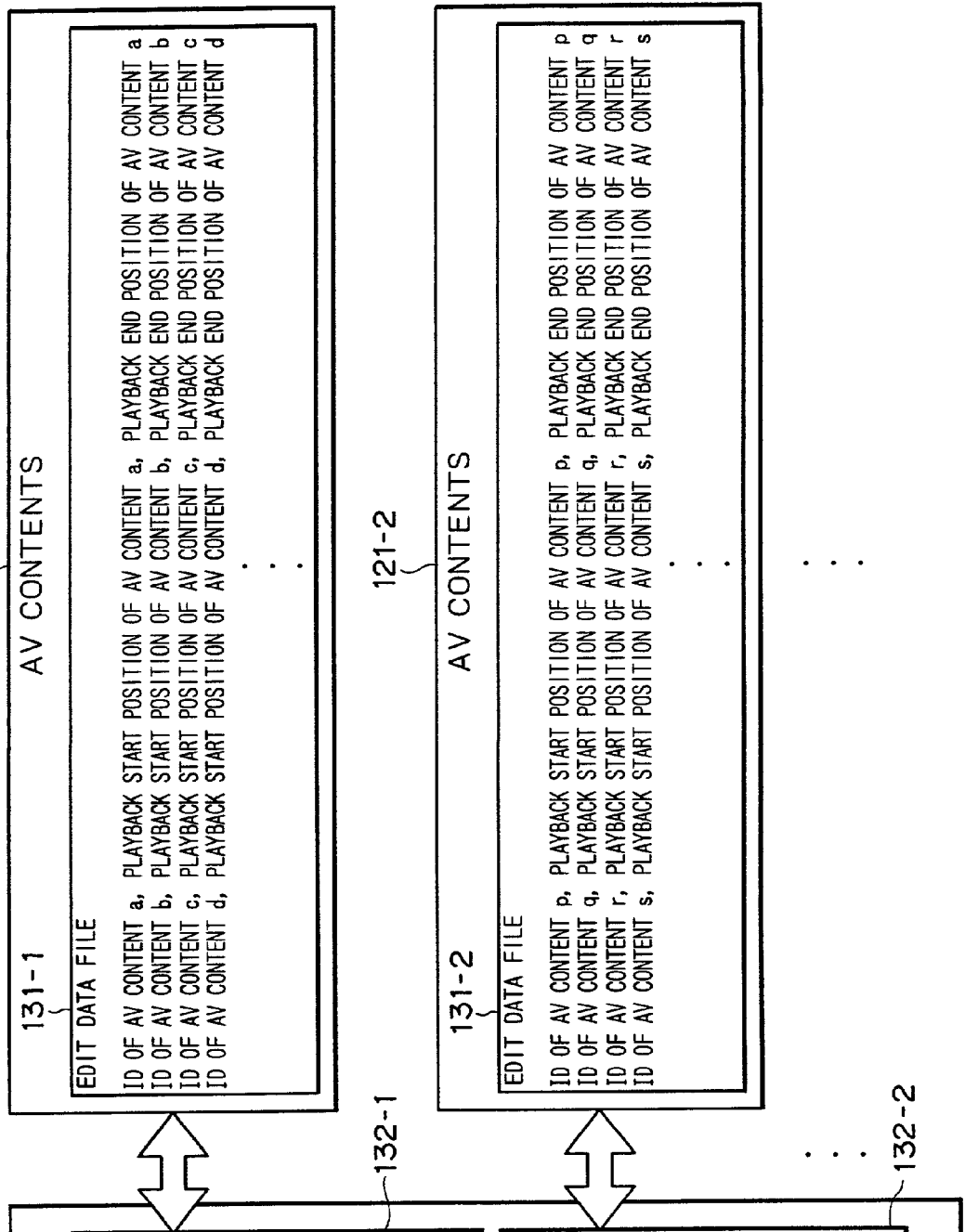
FIG. 8 is another explanatory view showing how AV contents are typically structured.

FIG. 8 is an explanatory view showing how the AV contents 101 are typically generated by the AV content editing program 83. Illustratively, AV contents 121-1 generated by the AV content editing program 83 are made of an edit data file 131-1 that comprises the ID, playback start position, and playback end position of an AV content "a" currently referenced; the ID, playback start position, and playback end position of an AV content "b" currently referenced; and the ID, playback start position, and playback end position of an AV content "c" also currently referenced.

Similarly, AV contents 121-2 generated by the AV content editing program 83 are constituted illustratively by an edit data file 131-2 that includes the ID, playback start position, and playback end position of an AV content "p" currently referenced; the ID, playback start position, and playback end position of an AV content "q" currently referenced; and the ID, playback start position, and playback end position of an AV content "r" also currently referenced.

An AV content attribute record 132-1 corresponding to the AV contents 121-1 generated by the AV content editing program 83 contains such data as name, ID, date and time of creation, date and time of change, recording time, status, expiration date, setting of accidental erasure prevention, presence or absence of error, and memo. An AV content attribute record 132-2 corresponding to the AV contents 121-2 comprises such data as name, ID, date and time of creation, date and time of change, recording time, status, expiration date, setting of accidental erasure prevention, presence or absence of error, and memo.

The "status" data in the AV content attribute record 132-1 indicate that the AV contents 131-1 are in playback-yet-to-be-performed, playback-in-progress, or playback-complete status. Similarly, the "status" data in the AV content attribute record 132-2 denote that the AV contents 131-2 are in playback-yet-to-be-performed, playback-in-progress, or playback-complete status.

Utilizing the AV contents 121-1 or 121-2 makes it possible to edit images and sounds through the use of limited storage regions. In the description that follows, the AV contents 121-1 and 121-2 will be referred to collectively as the AV contents 121 where there is no specific reason to distinguish them. In like manner, the AV content attribute records 132-1 and 132-2 will be referred to collectively as the AV content attribute record 132.

Figure 9:
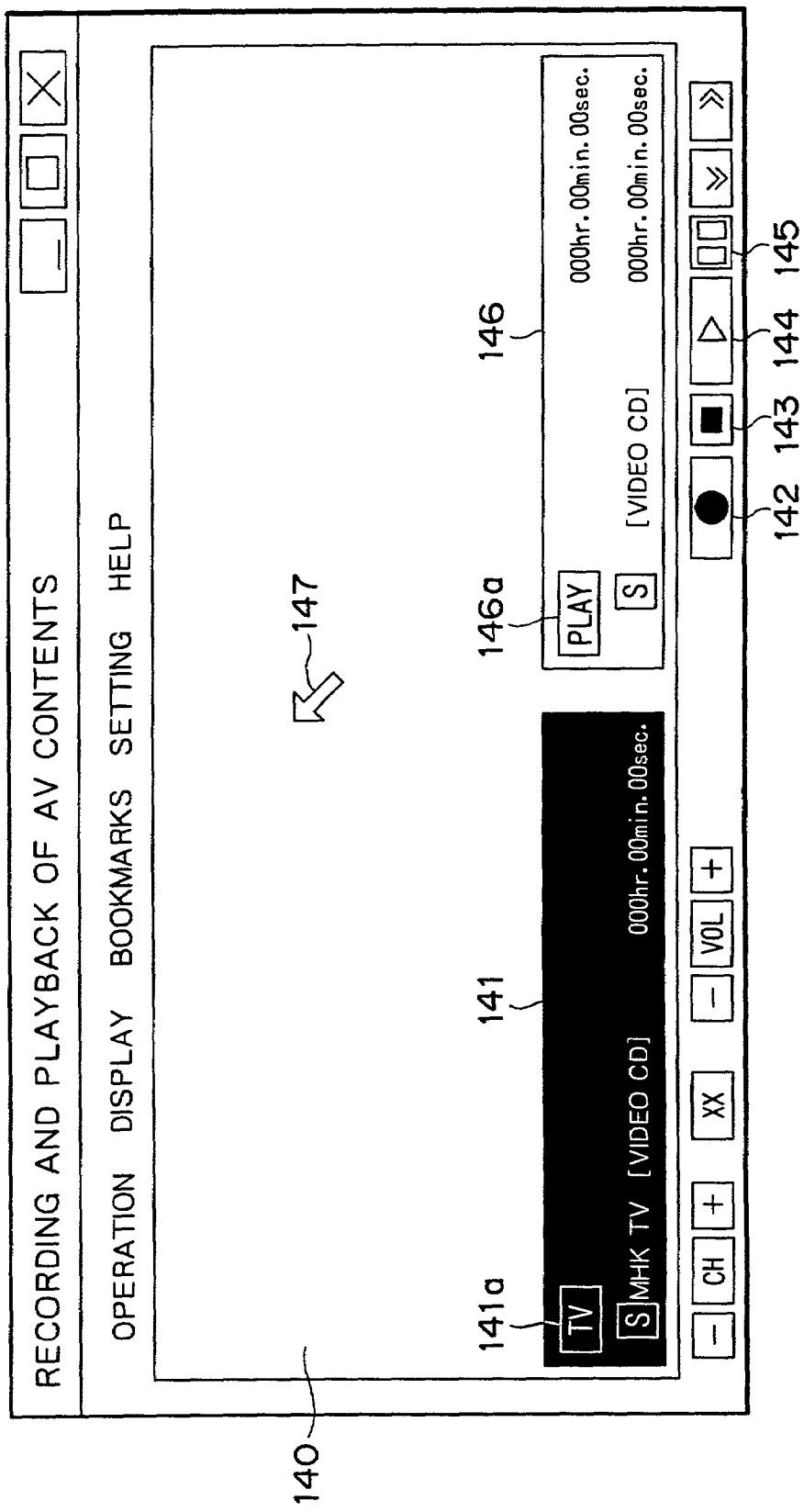
FIG. 9 is an explanatory view of a screen displayed by a recording/playback program 81.

Described below are screens displayed by the recording/playback program 81 on the CRT 30 of the personal computer 11. FIG. 9 is an explanatory view of a screen displayed by the recording/playback program 81 when recording operations are allowed.

Figure 10:
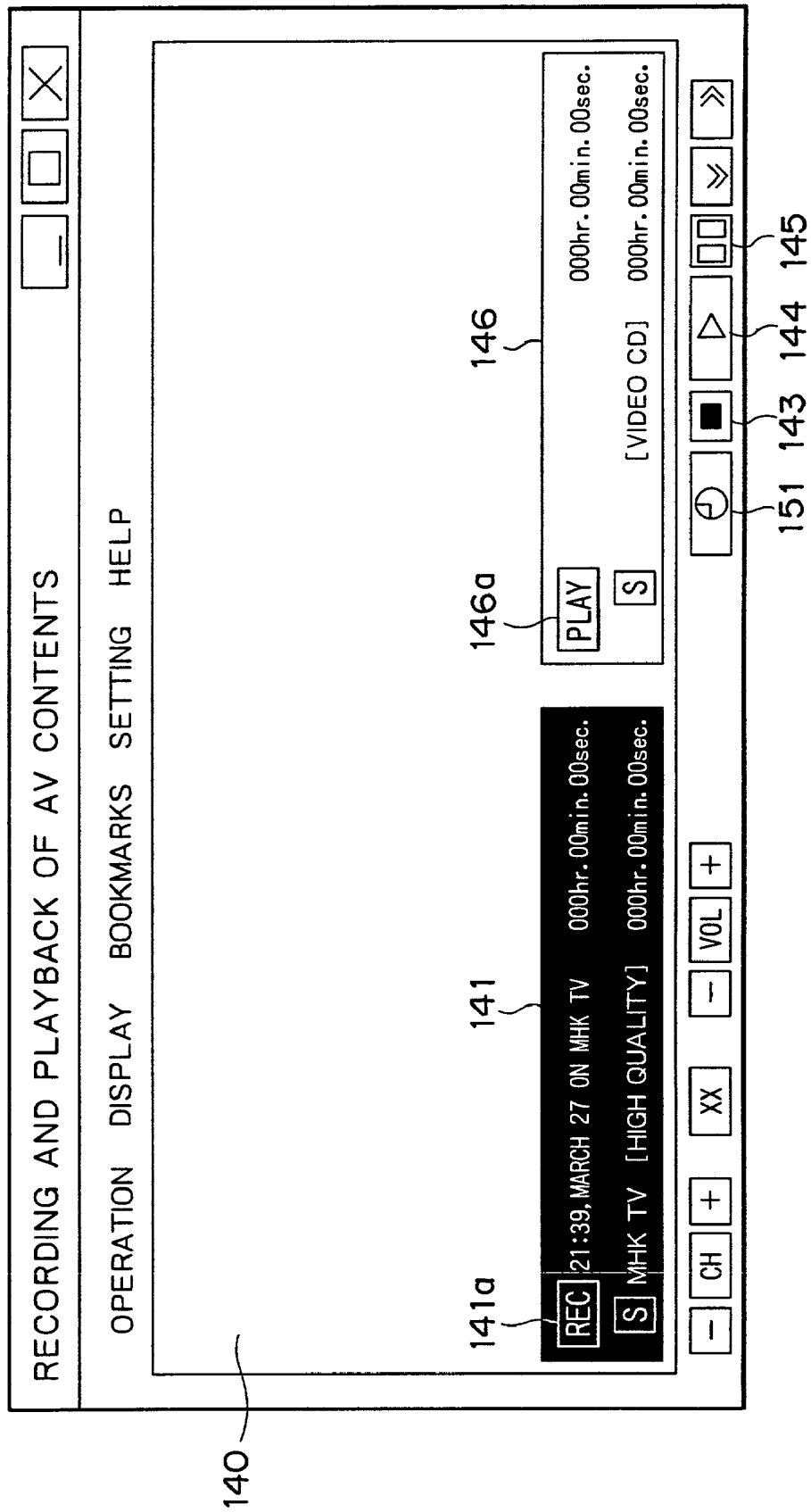
FIG. 10 is an explanatory view of another screen displayed by the recording/playback program 81.

An image display window 140 for displaying images to be recorded or played back has a recording window 141 and a playback window 146. A TV channel to be recorded and a preferred recording mode are set in the recording window 141. A recording button 141a is displayed in the recording window 141. When the recording window 141 is active, clicking on the recording button 141a with the mouse starts a recording process. When recording is not underway, the recording button 141a indicates an input source of contents to be recorded, such as "TV" as shown in FIG. 9. When recording is started, the recording button 141a changes its indication to "REC" (FIG. 10). The playback window 146 has a playback button 146a. As with the recording button 146, clicking on the playback button 146a using the mouse in an active playback window 146 starts a playback process. The recording and playback processes will be described later in more detail.

When recording is started, the recording/playback program 81 sets the operation of the tuner 54 or MPEG encoder 58 in the image processing board 34 as designated in the recording window 141, generates necessary AV contents 101 and an AV content attribute record 102, and records what is generated to the HDD 31. When the recording window 141 is selected and remains active, a recording button 142 and a stop button 143 become active and operable. That is, while the recording window 141 is being selected and active, the recording/playback program 81 starts the recording process in response to the recording button 146a or 142 getting clicked on, and stops the process if the stop button 143 is clicked on.

While the recording window 141 is being selected and active, the playback button 146a or 144 and a pause button 145 become inactive. Clicking on the playback button 144 or pause button 145 leaves the recording/playback program 81 unaffected.

The user may move a cursor 147 onto desired buttons displayed by means of the mouse 29. Clicking on the necessary button using the mouse issues the relevant command.

FIG. 10 is an explanatory view of another screen displayed by the recording/playback program 81 on the CRT 30 of the personal computer 11 when recording is started. In addition to the TV channel being recorded and the recording mode in effect, the recording window 141 displays an elapsed time from the start of recording as well as the current time. Once recording gets underway, the recording button 142 is replaced by a recording time changing button 151. The recording time is changed every time the recording time changing button 151 is clicked on.

FIGS. 11A, 11B and 11C are explanatory views depicting how recording times are changed by clicking on the recording time changing button 151. When recording is started, the recording time is set initially to a maximum recordable time calculated by use of a recordable data size (i.e., available capacity) of the HDDs 31-1 and 31-2 and the amount of video data per unit recording time determined by the recording mode in effect. For example, suppose that the HDDs 31-1 and 31-2 have recordable data sizes of 3 and 6 gigabytes respectively and that the amount of video data per second in the standard recording mode is 5 megabits. In that case, the maximum recordable time is computed as follows: (3 gigabytes+6 gigabytes)*(8 bits/byte)/(5 megabits/second) =14,400 seconds=4 hours.

If less than 30 minutes have passed since the start of recording and if the recording time is set for a maximum recordable time as shown in FIG. 11A, then clicking on the recording time changing button 151 sets the recording time to 30 minutes. Clicking on the recording time changing button 151 repeatedly from that setting on sets the recording time progressively to 1 hour, 1 hour 30 minutes, 2 hours, 2 hours 30 minutes, and 3 hours. Clicking on the recording time changing button 151 when the recording time is currently set to 3 hours reverts the setting to the maximum recordable time.

If the elapsed time since the start of recording is more than 30 minutes but less than one hour and if the maximum recordable time is being set as shown in FIG. 11B, then clicking on the recording time changing button 151 sets the recording time to 1 hour. Clicking on the recording time changing button 151 repeatedly from that setting on sets the recording time progressively to 1 hour 30 minutes, 2 hours, 2 hours 30 minutes, and 3 hours. Clicking on the recording time changing button 151 when the recording time is set to 3 hours reverts the setting to the maximum recordable time.

If the elapsed time since the start of recording is more than 1 hour 30 minutes but less than two hours and if the maximum recordable time is being set as shown in FIG. 11C, then clicking on the recording time changing button 151 sets the recording time to 2 hours. Clicking on the recording time changing button 151 repeatedly from that setting on sets the recording time progressively to 2 hours 30 minutes and to 3 hours. Clicking on the recording time changing button 151 when the recording time is set to 3 hours reverts the setting to the maximum recordable time.

As described, the user need only click on the recording time changing button 151 to change the recording time simply and as desired.

Figure 12:
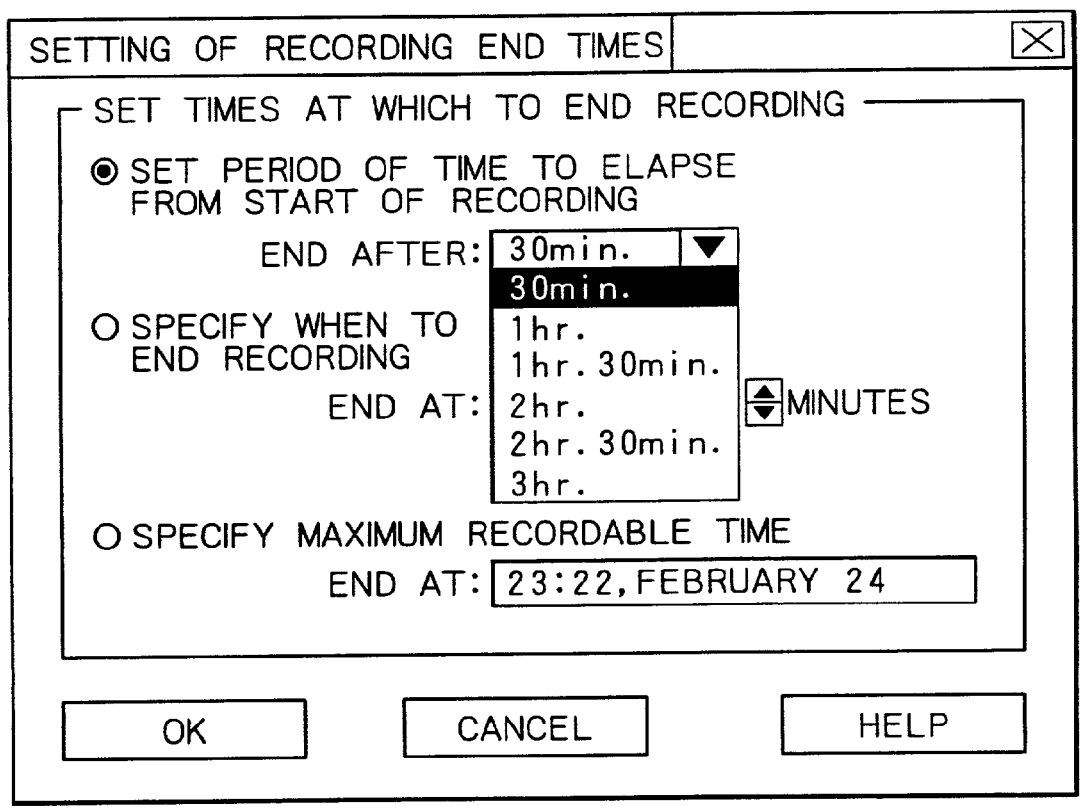
FIG. 12 is an explanatory view of a recording time setting window.
Figure 13:
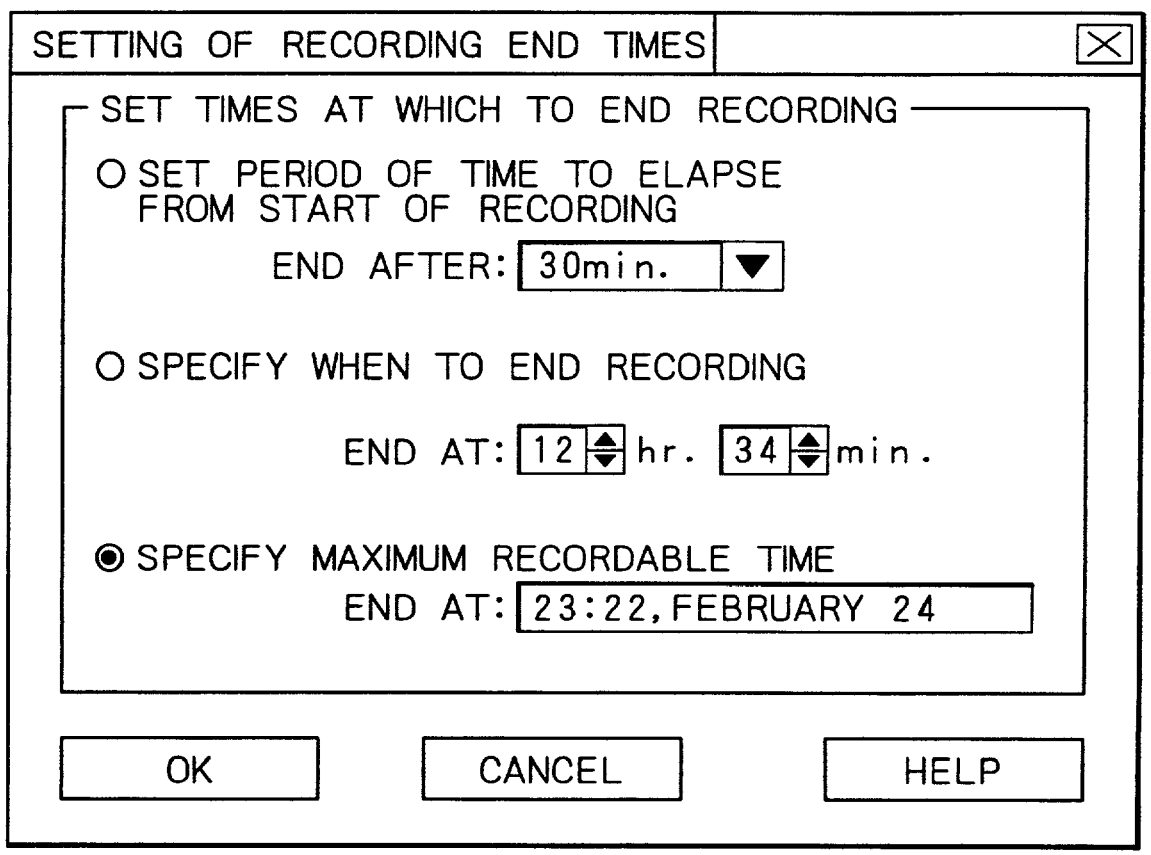
FIG. 13 is another explanatory view of the recording time setting window.

The recording time may also be set through a recording time setting window that is displayed by selecting suitable menu commands from the screen of the recording/playback program 81. FIGS. 12 and 13 are explanatory views of the recording time setting window. FIG. 12 shows a screen in which the recording time period from a start time is selected by use of a pull-down menu. FIG. 13 depicts a screen in which to select a maximum recordable time. With the recording time setting window displayed, the user can set a desired recording time quickly.

Figure 14:
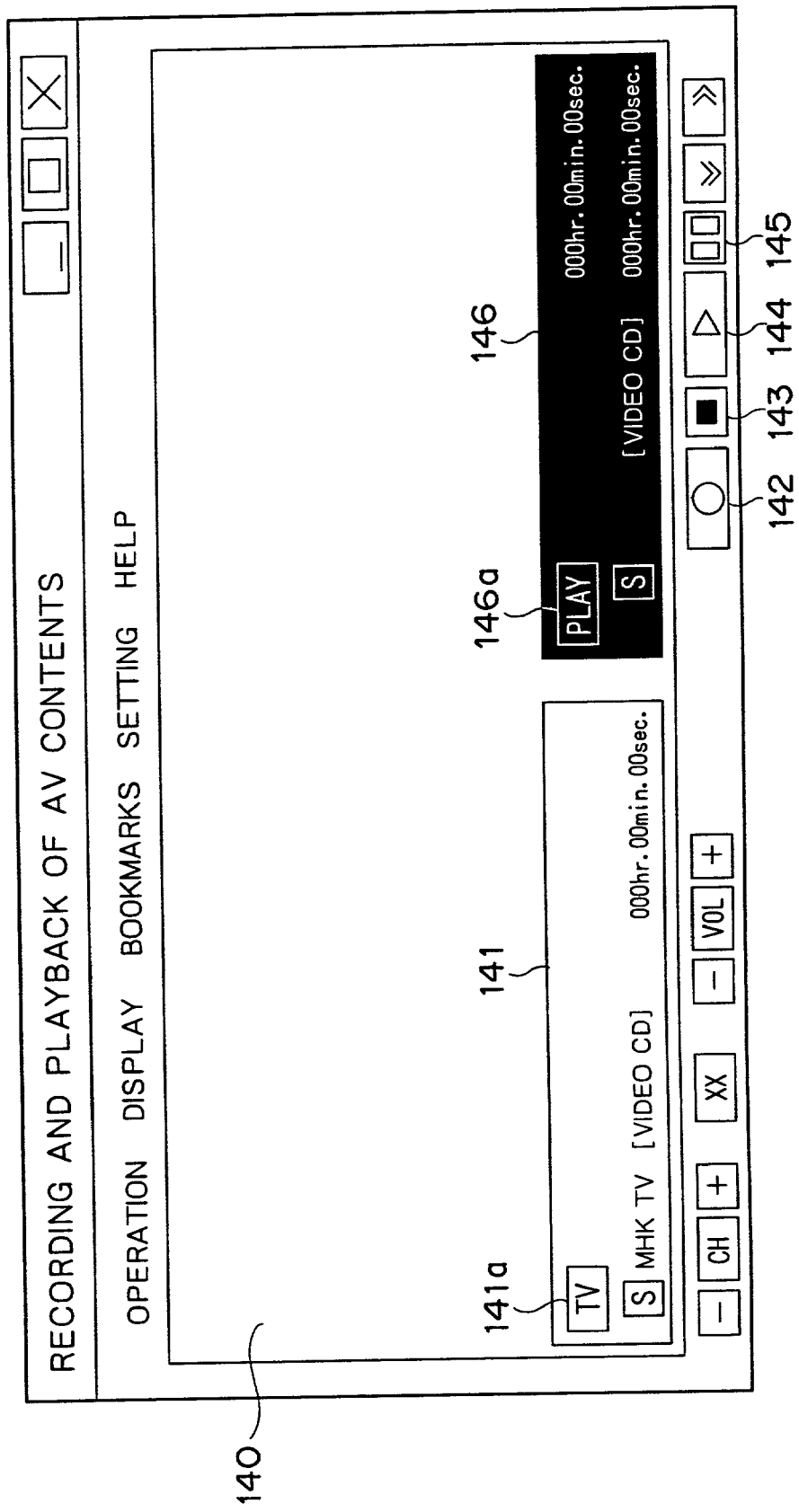
FIG. 14 is an explanatory view of another screen displayed by the recording/playback program 81.

Described below is a screen displayed by the recording/playback program 81 playing back the AV contents 101 or 121. FIG. 14 shows a typical screen displayed by the recording/playback program 81 on the CRT 30 of the personal computer 11 when playback operations are allowed.

The playback window 146 indicates the recording mode of the AV contents to be played back and other information. If the playback window 146 is selected and active, then the stop button 143, playback button 144 or 146a, and pause button 145 become active and operable. That is, while the recording window 141 is being selected and active, the recording/playback program 81 starts the playback process in response to the playback button 144 (or 146a) getting clicked on, temporarily stops playback if the pause button 145 is clicked on, and stops the playback process in reply to the stop button 143 getting clicked on.

While the playback window 146 is being selected and active, the recording button 142 becomes inactive. Clicking on the recording button 142 or 141a then leaves the recording/playback program 81 unaffected.

As described, the recording/playback program 81 either activates or deactivates the recording button 142, stop button 143, playback button 144, and pause button 145 depending on either the recording window 141 or playback window 146 being selected. This allows the user clearly to recognize what can and cannot be operated and to perform enabled operations quickly without making mistakes.

Figure 15:
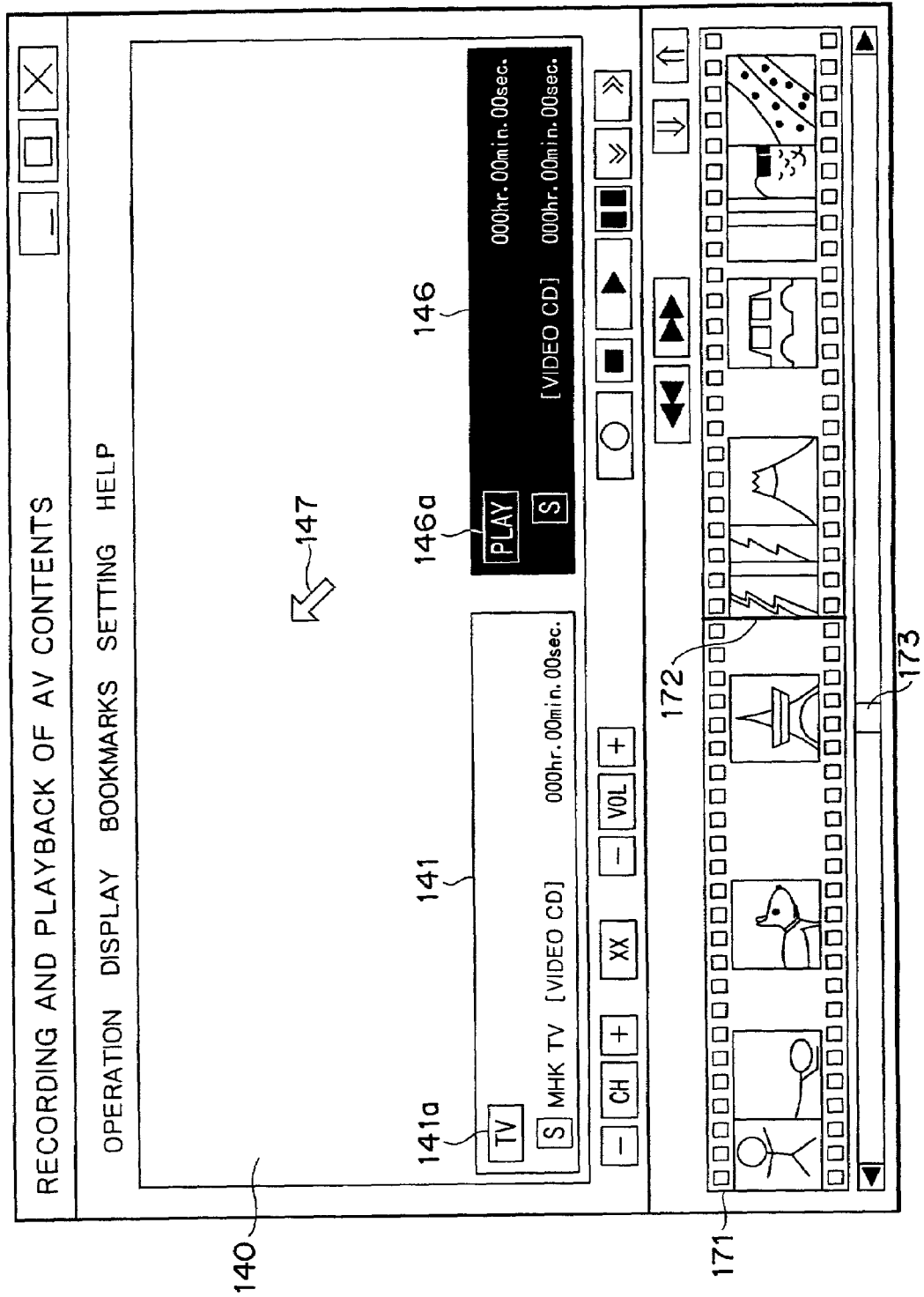
FIG. 15 is an explanatory view of another screen displayed by the recording/playback program 81.

FIG. 15 is an explanatory view of a screen that appears on the CRT 30 of the personal computer 11 when the recording/playback program 81 plays back the AV contents 101-1 to display still images held in the still image data files 112-1-1 through 112-1-3. In this screen, a still image display window 171 displays as thumbnail images the still images (i.e., scene-changing still pictures) contained in the still image data files 112-1-1 through 112-1-3. Crosswise positions in the still image display window 171 represent the time base for images to be played back on.

A current position indicator gauge 172 corresponds to the current position, i.e., the point in time at which images are being played back. Positions on the left of the current position indicator gauge 172 denote points in the past (where images were played back) directly proportional to the distances from the gauge 172; positions to the right of the gauge 172 represent points in the future (where images are yet to be played back) directly proportional to the distances from the gauge 172.

In the still image display window 171, each thumbnail image appears at a point in time where scenes are changed. If scene changes take place at short intervals, thumbnail images are displayed in an overlaid manner. As more and more images appear (i.e., as time elapses), the position of thumbnail image display shifts from right to left in the window.

By performing drag or other operations, the user may scroll only the thumbnail images in the still image display window 171 apart from the image being played back. The thumbnail images may also be scrolled by manipulating a scroll bar 173. In any case, the distance between thumbnail images always reflects the elapsed time between the corresponding scene changes.

As described, the user can quickly recognize scene changes within a desired range by watching thumbnail images in the still image display window 171. This makes it possible for the user to have immediate access to any desired scenes.

What follows is a description of how thumbnail images are displayed in the still image display window 171. If scene changes occur at very short intervals, thumbnail images are displayed in an overlaid manner as mentioned above and as sketched in FIG. 16A. FIG. 16A shows thumbnail images A, B and C so closely overlaid that only the image C on top of the others can be viewed on the screen.

By contrast, if scene changes rarely occur, no thumbnail image may appear in the still image display window 171 as shown in FIG. 16B. In such a case, there are few clues the user can rely on when searching for a desired scene.

Figure 17A:
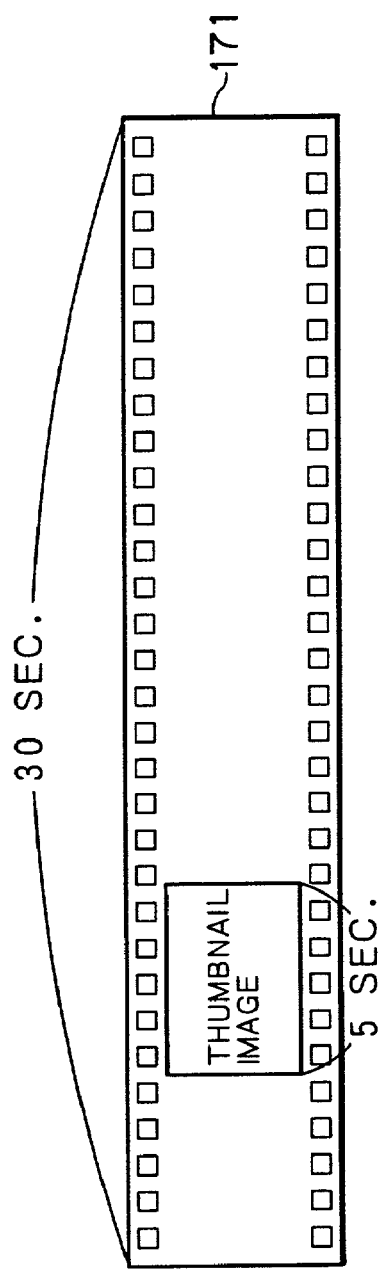
FIGS. 17A and 17B are more explanatory views illustrating how thumbnail images are typically displayed in the still image display window 171.
Figure 17B:
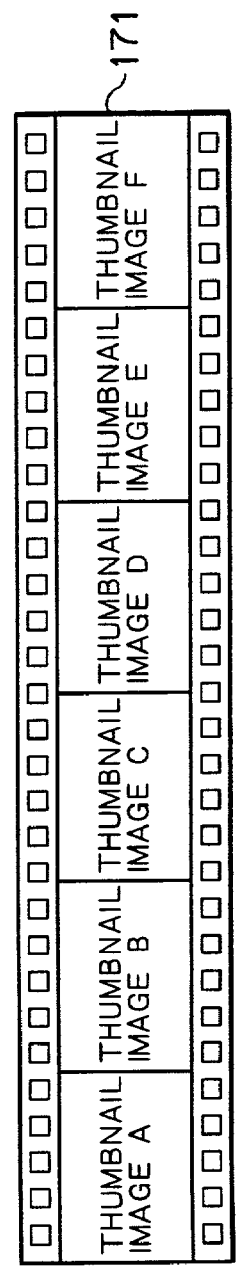

The bottleneck above is bypassed by controlling thumbnail image display in a manner to be discussed below so that thumbnail images will not be overlaid and that the absence of thumbnail images will be averted. As illustrated in FIG. 17A, the distance between the leftmost and the rightmost positions in the still image display window 171 represents a time period of 30 seconds. A single thumbnail image has a length corresponding to five seconds. It follows that up to six thumbnail images A through F may be displayed in non-overlapping fashion within the still image display window 171 as shown in FIG. 17B.

To display at least one thumbnail image at all times in the still image display window 171 requires preparing one thumbnail image at intervals of about 30 seconds. But if thumbnail images are present at intervals of exactly 30 seconds, there may not be any thumbnail image appearing in the still image display window 171 at a given point in time. On the other hand, if thumbnail images occur at intervals of 29 seconds, then at least one thumbnail image corresponding to a time period of one second always appears in the window 171.

However, a one-second thumbnail image display is of not much use for the user in terms of reference. At least one complete thumbnail image needs to be displayed at all times in the still image display window 171. This is accomplished by making arrangements such that thumbnail images are generated at intervals of, say, 15 seconds. Thumbnail images appearing at intervals of 15 seconds allow the still image display window 171 always to show at least one complete thumbnail image therein, as illustrated in FIG. 18.

When thumbnail images are displayed in the still image display window 171 as described above, the user finds it easier to search for preferred scenes based on the displayed images. However, the screen shows no information as to where exactly a given thumbnail image displayed is located within the program; there is no way of knowing whether a given image comes chronologically before or after the image currently displayed (i.e., played back) in the image display window 140. Then the user must search for desired scenes based solely on the displayed thumbnail images.

As mentioned above, the user may experience inconvenience when looking for a preferred scene by relying solely on the displayed thumbnail images. That deficiency is circumvented by having information displayed in a way representing a time stamp of each thumbnail image. How time stamp information is presented will now be described by referring to FIG. 19. FIG. 19 shows only part of the screen displayed on the CRT 30 (i.e., lower part of the display screen in FIG. 15).

As illustrated in FIG. 19, a position time display part 181 and a differential time display part 182 appear in the upper area of the still image display window 171 when the user sets the cursor 147 to the scroll bar 173 for a drag operation or clicks on (i.e., drags) a given thumbnail image. The position time display part 181 displays an elapsed time since the beginning of a program containing a thumbnail image in the still image display window 171. Illustratively, suppose that the program has been viewed from the beginning and that a thumbnail image corresponding to a scene 30 minutes into the program is clicked on. In that case, the position time display part 181 indicates "00 hr. 30 m. 00 s." as shown in FIG. 20.

The differential time display part 182 indicates a time stamp of a thumbnail image relative to the image being displayed (i.e., played back) in the image display window 140. Illustratively, if the clicked-on thumbnail image represents a scene one minute earlier than the image in the image display window 140, then the differential time display part 182 displays "−00 hr. 01 m. 00 s." (a minus symbol represents an earlier time) as shown in FIG. 21A. If the selected thumbnail image represents a scene one minute later than the current image, then an indication "00 hr. 01 m. 00 s." appears as shown in FIG. 21B.

In the example above, the position time display part 181 and differential time display part 182 showed time information about the clicked-on thumbnail image. On the other hand, if the user is dragging the scroll bar 173, then the screen shows time information corresponding to a midpoint of the still image display window 171. Illustratively, as shown in FIG. 22, when the current position indicator gauge 172 is set to the midpoint of the still image display window 171 by a drag operation of the scroll bar 173, the differential time display part 182 gives an indication "00 hr. 00 m. 00 s."

Given such position time and differential time information, the user can search for desired scenes accordingly. For example, if it is desired to watch a program from the scene 30 minutes into it, the user need only drag the scroll bar 173 until a time indication "00 hr. 30 m. 00 s." appears in the position time display part 181. To watch the program from the scene two minutes from now, the user may drag the scroll bar 173 until a time indication "00 hr. 02 m. 00 s." appears in the differential time display part 182.

In the manner described, the inventive scheme lets the user look for preferred scenes easily and instantaneously.

Figure 23:
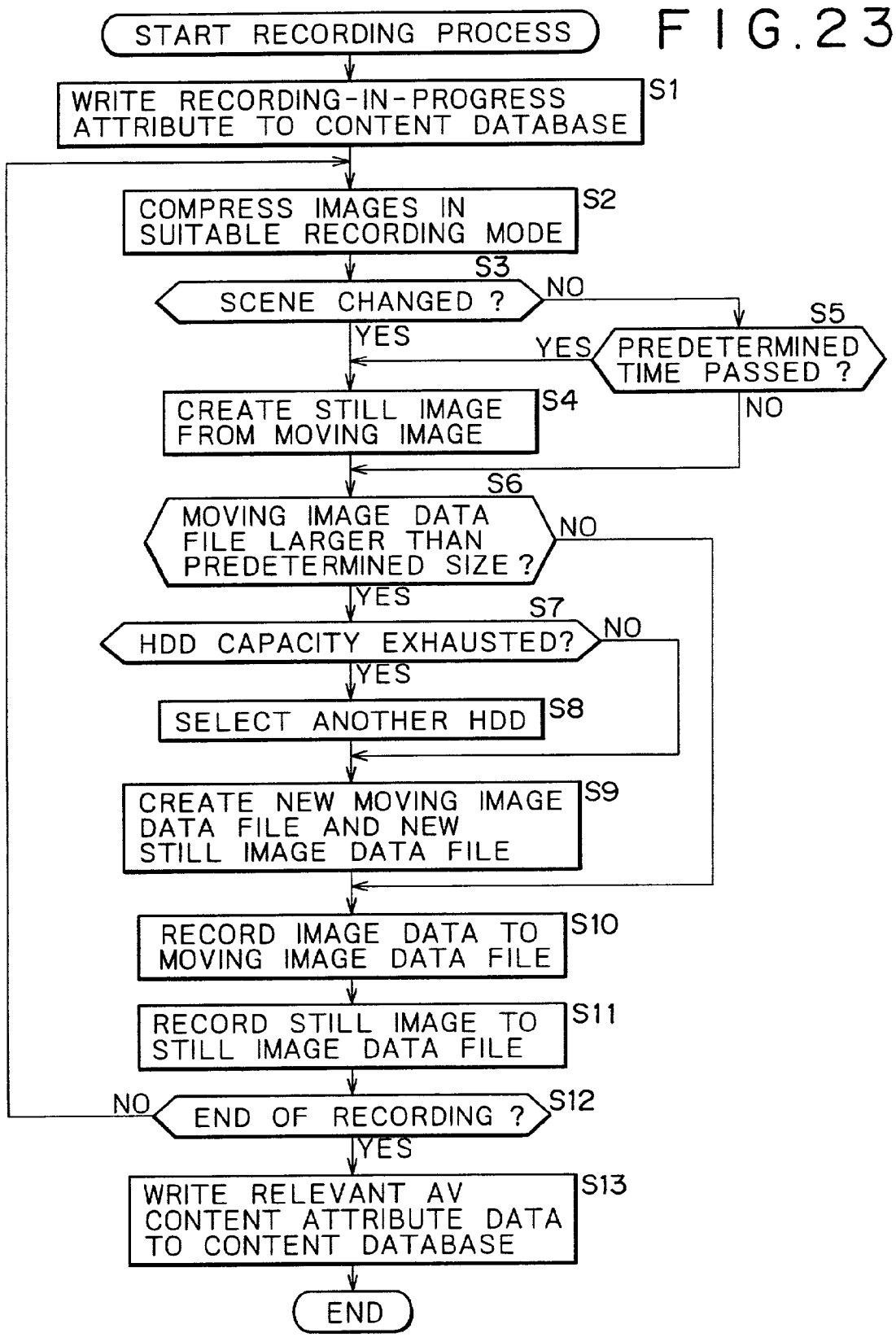
FIG. 23 is a flowchart of steps constituting a recording process.

Described below with reference to the flowchart of FIG. 23 is the recording process carried out when the recording/playback program 81 is loaded into the RAM 23 and executed by the CPU 21. In step S1, the recording/playback program 81 writes to the content database 92 an attribute indicating that a relevant AV content is being recorded. In step S2, the recording/playback program 81 causes the hardware interface 91 to compress in a desired recording mode (high quality, standard, etc.) the images to be recorded to the MPEG encoder 58.

In step S3, the recording/playback program 81 causes the hardware interface 91 to judge whether a scene change has occurred during recording on the basis of outputs from the MPEG encoder 58. If a scene change is detected, step S4 is reached in which the MPEG encoder 58 is instructed to generate a still image corresponding to the current image (i.e., moving image).

If in step S3 no scene change is detected during the recording, step S5 is reached. In step S5, a check is made to see if a predetermined time period has elapsed since the last still image (thumbnail image) was generated. This check is required because still images need to be created illustratively at intervals of 15 seconds so that at least one thumbnail image is always displayed in the still image display window 171. If the predetermined time period is set for 15 seconds, then the check in step S5 is made to see if 15 seconds have passed since the last still image was generated. If the predetermined time is judged to have elapsed in step S5, step S4 is reached in which a still image is generated.

If in step S5 the predetermined time period is not judged to have elapsed, there is no need to generate a still image yet. In that case, step S4 is skipped and step S6 is reached.

In step S6, the recording/playback program 81 causes the file I/O 93 to judge whether the moving image data file 111 accommodating compressed images has exceeded a predetermined size. If the moving image data file 111 is judged to have exceeded the predetermined size, step S7 is reached. In step S7, a check is made to see if the available capacity of the HDD 31 holding the moving image data file 111 has been exhausted.

If in step S7 the available capacity of the HDD 31 accommodating the moving image data file 111 is judged to be exhausted, step S8 is reached. In step S8, the recording/playback program 81 selects another HDD 31.

If in step S7 the HDD 31 containing the moving image data file 111 is judged still to have an available capacity, that means the HDD 31 may accommodate further data of the file 111. In that case, step S8 is skipped and step S9 is reached.

Inn step S9, the recording/playback program 81 causes the file I/O 93 to create a new moving image data file 111 and a new still image data file 112 on the HDD 31, so that compressed images will be written to the new moving image data file 111 and created still images to the new still image data file 112. Step S9 is followed by step S10.

If in step S6 the moving image data file 111 is judged yet to exceed the predetermined size, that means compressed images may continuously be written to the current moving image data file 111. In that case, step S6 is followed by step S10.

In step S10, the recording/playback program 81 causes the file I/O 93 to write the images compressed by the MPEG encoder 58 to the moving image data file 111 on the HDD 31. In step S11, the recording/playback program 81 records the still image generated by the MPEG encoder 58 together with related data such as a scene playback time to the still image data file 112 on the HDD31.

In step S12, the recording/playback program 81 determines whether or not to end the recording process on the basis of recording time settings or on inputs from the mouse 29. If it is determined not to end the recording process, step S2 is reached again and the process is repeated.

If in step S12 it is determined to end the recording process, step S13 is reached. In step S13, the recording/playback program 81 writes to the content database 92 an attribute indicating that recording of the AV content 101 is terminated. This completes the recording process.

Figure 24:
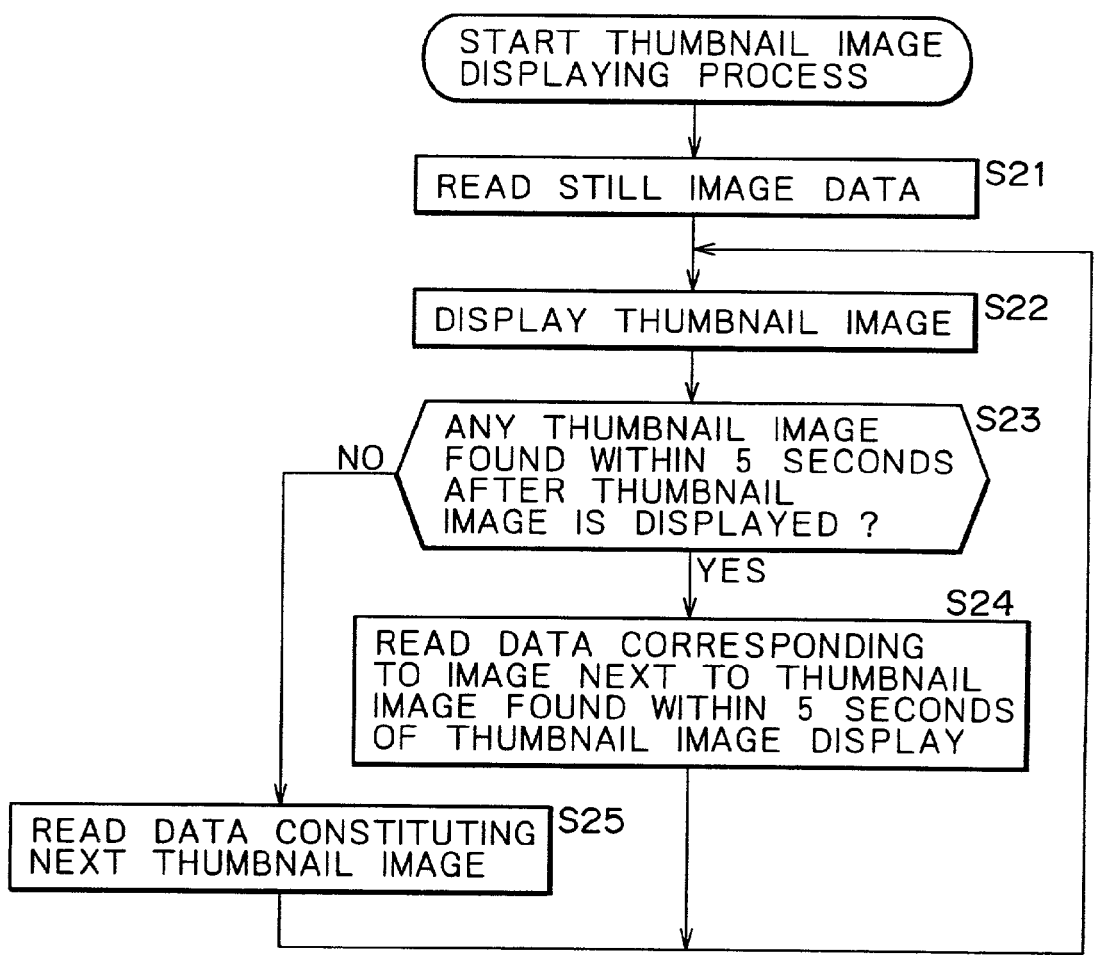
FIG. 24 is a flowchart of steps constituting a thumbnail image displaying process.

Described below with reference to the flowchart of FIG. 24 is the process of displaying a still image with the recording/playback program 81, hardware interface 91 and file I/O 93 loaded into the RAM 23 and executed by the CPU 21. The process in FIG. 24 is carried out regardless of a synchronous or an asynchronous mode being in effect. The synchronous mode is a mode in which the image currently played back corresponds to the thumbnail image position in the still image display window 171; the asynchronous mode is a mode in which the image currently played back does not correspond to the thumbnail image position in the still image display window 171.

In step S21, if the synchronous mode is in effect, still image data corresponding to the time stamp of the currently reproduced image are read from the still image data file 112; with the asynchronous mode selected, still image data corresponding to the position and time of a thumbnail image being dragged (on scroll bar 173) are read from the still image data file 112. In step S22, a thumbnail image is displayed in a suitably computed position using the still image data retrieved in step S22.

In step S23, a check is made to see if there exists any thumbnail image within five seconds after the time stamp of the thumbnail image displayed in step S22. If in step S23 a thumbnail image or images are judged to exist within the five-second range, step S24 is reached. In step S24, still image data are read which represent an image next to the thumbnail image or images (up to four images) in the five-second range, the ensuing image occurring at least six seconds later than the most recent existing image. After the data are retrieved, step S22 is reached again and the process is repeated.

If in step S23 no thumbnail image is judged to exist within the five-second range, i.e., if the next thumbnail image is supposed to exist at least six seconds later, then step S25 is reached. In step S25, the data representing the next thumbnail image are read out. After the data retrieval, step S22 is reached again and the process is repeated.

When thumbnail image display is controlled as described, thumbnail images appear in nonoverlapping fashion in the still image display window 171. Furthermore, at least one thumbnail image is displayed at all times in the window 171.

Described below with reference to the flowchart of FIG. 25 is the process of displaying time information in the position time display part 181 and differential time display part 182. In step S31, either a thumbnail image in the still image display window 171 or the scroll bar 173 is judged to be dragged. The judgment in step S31 is followed by step S32.

In step S32, the times to be displayed in the position time display part 181 and differential time display part 182 are computed in accordance with the amount of the drag. As mentioned above, the position time display part 181 indicates an elapsed time from the beginning of the program in question, while the differential time display part 182 shows a time indication relative to the currently reproduced image (i.e., image on display in the image display window 140). After the computations involved, step S33 is reached in which the computed times are displayed in the position time display part 181 and differential time display part 182.

In step S34, a check is made to see if the drag operation has come to an end. If the drag is not judged to be terminated, step S32 is reached again and the process is repeated. If inn step S34 the drag operation is judged to be terminated, step S35 is reached. In step S35, the time indications are erased from the position time display part 181 and differential time display part 182.

When the user is presented with time-related information in the manner described, the user can search for desired scenes easily and without delay.

Although the examples above have shown both position time and differential time information to be displayed, this is not limitative of the invention. Alternatively, only one of the two kinds of time information may be displayed. It is also possible to make arrangements so that the date and time at which a program was actually recorded may be displayed.

The series of steps described above may be executed either by hardware or by software. For software-based processing to take place, programs constituting the software may be either incorporated beforehand in dedicated hardware or installed upon use from a suitable program storage medium into a general-purpose personal computer or like equipment capable of executing diverse functions.

As shown in FIG. 2, the program storage medium is offered to users not only in the form of the hard disk drives 31-1 and 31-2 which contain the programs and which are incorporated beforehand in the personal computer 11, but also as a package medium constituted by a magnetic disc 111 (including floppy discs), an optical disc 112 (including CD-ROM (Compact Disc-read Only Memory) and DVD (Digital Versatile Disc)), a magneto-optical disc 113 (including MD (Mini-disc)), or a semiconductor memory 114.

In this specification, the steps which are preserved on the program storage medium and which describe the programs to be executed represent not only processes that are carried out in the depicted sequence (i.e., on a time series basis) but also those that are conducted parallelly or individually.

Through the use of the above-described information processing apparatus, information processing method and program storage medium according to the invention, a scene change detected in moving images is translated into a corresponding still image that is recorded together with a time stamp. If no scene change is detected over a predetermined time period, still images representing the moving image are generated regardless of scene changes being absent, and the generated still images are recorded along with their time stamps. The scheme makes it possible to present still images that are easy to look up.

As many apparently different embodiments of this invention may be made without departing from the spirit and scope thereof, it is to be understood that the invention is not limited to the specific embodiments thereof except as defined in the appended claims.

What is claimed is:

1. An information processing apparatus comprising:
   first recording controlling means for recording moving images;
   first detecting means for detecting scene changes in said moving images recorded by said first recording controlling means;
   second recording controlling means which, if scene changes are detected from said moving images by said first detecting means, then records still images corresponding to the detected scene changes together with time stamps pertaining to the recorded still images;
   third recording controlling means which, if no still image is recorded by said second recording controlling means over a predetermined time period, then records still images at predetermined intervals based on said moving images together with time stamps pertaining to the recorded still images;
   first playback controlling means for playing back said moving images recorded by said first recording controlling means; and
   second playback controlling means for playing back the recorded still images in a display window at relative distances to one another proportional to differentials between said time stamps.

2. An information processing apparatus comprising:
   first recording controlling means for recording moving images;
   first detecting means for detecting scene changes in said moving images recorded by said first recording controlling means;
   second recording controlling means which, if scene changes are detected from said moving images by said first detecting means, then records still images corresponding to the detected scene changes together with time stamps pertaining to the recorded still images;
   third recording controlling means which, if the number of scene changes detected by said first detecting means over a predetermined time period is judged excessively large, then records still images that are fewer than the detected scene changes and based on said moving images, together with time stamps pertaining to the recorded still images;
   first playback controlling means for playing back said moving images recorded by said first recording controlling means; and
   second playback controlling means for playing back the recorded still images in a display window at relative distances to one another proportional to differentials between said time stamps.

3. An information processing method comprising the steps of:
   firstly recording moving images;
   firstly detecting scene changes in said moving images recorded in said first recording step;
   if scene changes are detected from said moving images in said first detecting step, then secondly recording still images corresponding to the detected scene changes together with time stamps pertaining to the recorded still images;
   if no still image is recorded in said second recording step over a predetermined time period, then thirdly recording still images at predetermined intervals based on said moving images together with time stamps pertaining to the recorded still images;
   firstly playing back said moving images recorded in said first recording step; and
   secondly playing back the recorded still images in a display window at relative distances to one another proportional to differentials between said time stamps.

4. An information processing method comprising the steps of:
   firstly recording moving images;
   firstly detecting scene changes in said moving images recorded in said first recording step;
   if scene changes are detected from said moving images in said first detecting step, then secondly recording still images corresponding to the detected scene changes together with time stamps pertaining to the recorded still images;
   if the number of scene changes detected in said first detecting step over a predetermined time period is judged excessively large, then thirdly recording still images that are fewer than the detected scene changes and based on said moving images, together with time stamps pertaining to the recorded still images;
firstly playing back said moving images recorded in said first recording step; and
secondly playing back the recorded still images in a display window at relative distances to one another proportional to differentials between said time stamps.

5. A computer readable storage medium on which is written an information processing method comprising the steps of:
firstly recording moving images;
firstly detecting scene changes in said moving images recorded in said first recording step;
if scene changes are detected from said moving images in said first detecting step, then secondly recording still images corresponding to the detected scene changes together with time stamps pertaining to the recorded still images;
if no still image is recorded in said second recording step over a predetermined time period, then thirdly recording still images at predetermined intervals based on said moving images together with time stamps pertaining to the recorded still images;
firstly playing back said moving images recorded in said first recording step; and
secondly playing back the recorded still images in a display window at relative distances to one another proportional to differentials between said time stamps.

6. A computer readable storage medium on which is written an information processing method comprising the steps of:
firstly recording moving images;
firstly detecting scene changes in said moving images recorded in said first recording step;
if scene changes are detected from said moving images in said first detecting step, then secondly recording still images corresponding to the detected scene changes together with time stamps pertaining to the recorded still images;
if the number of scene changes detected in said first detecting step over a predetermined time period is judged excessively large, then thirdly recording still images that are fewer than the detected scene changes and based on said moving images, together with time stamps pertaining to the recorded still images;
firstly playing back said moving images recorded in said first recording step; and
secondly playing back the recorded still images in a display window at relative distances to one another proportional to differentials between said time stamps.

7. A computer readable storage medium having a program constituting an information processing method comprising the steps of:
firstly recording moving images;
firstly detecting scene changes in said moving images recorded in said first recording step;
if scene changes are detected from said moving images in said first detecting step, then secondly recording still images corresponding to the detected scene changes together with time stamps pertaining to the recorded still images;
if no still image is recorded in said second recording step over a predetermined time period, then thirdly recording still images at predetermined intervals based on said moving images together with time stamps pertaining to the recorded still images;
firstly playing back said moving images recorded in said first recording step; and
secondly playing back the recorded still images in a display window at relative distances to one another proportional to differentials between said time stamps.

8. A computer readable storage medium having a program constituting an information processing method comprising the steps of:
firstly recording moving images;
firstly detecting scene changes in said moving images recorded in said first recording step;
if scene changes are detected from said moving images in said first detecting step, then secondly recording still images corresponding to the detected scene changes together with time stamps pertaining to the recorded still images;
if the number of scene changes detected in said first detecting step over a predetermined time period is judged excessively large, then thirdly recording still images that are fewer than the detected scene changes and based on said moving images, together with time stamps pertaining to the recorded still images;
firstly playing back said moving images recorded in said first recording step; and
secondly playing back the recorded still images in a display window at relative distances to one another proportional to differentials between said time stamps.

9. An information processing apparatus comprising:
first recording controlling means for recording moving images;
first detecting means for detecting scene changes in said moving images recorded by said first recording controlling means;
second recording controlling means which, if scene changes are detected from said moving images by said first detecting means, then records still images corresponding to the detected scene changes together with time stamps pertaining to the recorded still images; and
third recording controlling means which, if no still image is recorded by said second recording controlling means over a predetermined time period, then records still images at predetermined intervals based on said moving images together with time stamps pertaining to the recorded still images.

10. An information processing apparatus comprising:
first recording controlling means for recording moving images;
first detecting means for detecting scene changes in said moving images recorded by said first recording controlling means;
second recording controlling means which, if scene changes are detected from said moving images by said first detecting means, then records still images corresponding to the detected scene changes together with time stamps pertaining to the recorded still images; and
third recording controlling means which, if the number of scene changes detected by said first detecting means over a predetermined time period is judged excessively large, then records still images that are fewer than the detected scene changes and based on said moving images, together with time stamps pertaining to the recorded still images.

11. An information processing method comprising the steps of:
firstly recording moving images;
firstly detecting scene changes in said moving images recorded in said first recording step;

if scene changes are detected from said moving images in said first detecting step, then secondly recording still images corresponding to the detected scene changes together with time stamps pertaining to the recorded still images; and if no still image is recorded in said second recording step over a predetermined time period, then thirdly recording still images at predetermined intervals based on said moving images together with time stamps pertaining to the recorded still images.

12. An information processing method comprising the steps of:

firstly recording moving images;

firstly detecting scene changes in said moving images recorded in said first recording step;

if scene changes are detected from said moving images in said first detecting step, then secondly recording still images corresponding to the detected scene changes together with time stamps pertaining to the recorded still images; and if the number of scene changes detected in said first detecting step over a predetermined time period is judged excessively large, then thirdly recording still images that are fewer than the detected scene changes and based on said moving images, together with time stamps pertaining to the recorded still images.

13. A computer readable storage medium on which is written an information processing method comprising the steps of:

firstly recording moving images;

firstly detecting scene changes in said moving images recorded in said first recording step;

if scene changes are detected from said moving images in said first detecting step, then secondly recording still images corresponding to the detected scene changes together with time stamps pertaining to the recorded still images; and if no still image is recorded in said second recording step over a predetermined time period, then thirdly recording still images at predetermined intervals based on said moving images together with time stamps pertaining to the recorded still images.

14. A computer readable storage medium on which is written an information processing method comprising the steps of:

firstly recording moving images;

firstly detecting scene changes in said moving images recorded in said first recording step;

if scene changes are detected from said moving images in said first detecting step, then secondly recording still images corresponding to the detected scene changes together with time stamps pertaining to the recorded still images; and if the number of scene changes detected in said first detecting step over a predetermined time period is judged excessively large, then thirdly recording still images that are fewer than the detected scene changes and based on said moving images, together with time stamps pertaining to the recorded still images.

15. A computer readable storage medium having a program constituting an information processing method comprising the steps of:

firstly recording moving images;

firstly detecting scene changes in said moving images recorded in said first recording step;

if scene changes are detected from said moving images in said first detecting step, then secondly recording still images corresponding to the detected scene changes together with time stamps pertaining to the recorded still images; and if no still image is recorded in said second recording step over a predetermined time period, then thirdly recording still images at predetermined intervals based on said moving images together with time stamps pertaining to the recorded still images.

16. A computer readable storage medium having a program constituting an information processing method comprising the steps of:

firstly recording moving images;

firstly detecting scene changes in said moving images recorded in said first recording step;

if scene changes are detected from said moving images in said first detecting step, then secondly recording still images corresponding to the detected scene changes together with time stamps pertaining to the recorded still images; and if the number of scene changes detected in said first detecting step over a predetermined time period is judged excessively large, then thirdly recording still images that are fewer than the detected scene changes and based on said moving images, together with time stamps pertaining to the recorded still images.

* * * * *